United States Patent
Yamamoto

(10) Patent No.: US 11,797,482 B2
(45) Date of Patent: Oct. 24, 2023

(54) SYSTEM FOR ORGANIZING DOCUMENT DATA

(71) Applicant: Ryosen Yamamoto, Osaka (JP)

(72) Inventor: Ryosen Yamamoto, Osaka (JP)

( * ) Notice: Subject to any disclaimer, the term of this patent is extended or adjusted under 35 U.S.C. 154(b) by 56 days.

(21) Appl. No.: 17/298,253

(22) PCT Filed: Nov. 28, 2019

(86) PCT No.: PCT/JP2019/046643
§ 371 (c)(1),
(2) Date: May 28, 2021

(87) PCT Pub. No.: WO2020/111197
PCT Pub. Date: Jun. 4, 2020

(65) Prior Publication Data
US 2022/0043772 A1 Feb. 10, 2022

(30) Foreign Application Priority Data
Nov. 30, 2018 (JP) .................. 2018-226110

(51) Int. Cl.
*G06F 16/16* (2019.01)
*G06F 16/93* (2019.01)
(Continued)

(52) U.S. Cl.
CPC ............ *G06F 16/16* (2019.01); *G06F 16/183* (2019.01); *G06F 16/2282* (2019.01); *G06F 16/93* (2019.01)

(58) Field of Classification Search
CPC .... G06F 16/16; G06F 16/183; G06F 16/2282; G06F 16/93
See application file for complete search history.

(56) References Cited

U.S. PATENT DOCUMENTS

| 7,890,486 B2* | 2/2011 | Claghorn | G06F 16/93 707/706 |
| 8,312,047 B2* | 11/2012 | Barker | G06F 16/9577 707/790 |

(Continued)

FOREIGN PATENT DOCUMENTS

| JP | 2006-004298 A | 1/2006 |
| JP | 2009-009551 A | 1/2009 |
| JP | 2016115127 A | 6/2016 |

OTHER PUBLICATIONS

Aug. 6, 2011, pp. 353-359, pp. 353-359, non-official translation (Noda, Yuki et al., "Perfect Master for Windows Server 2008 R2". 1st edition, Shuwa System Co., Ltd.).

(Continued)

*Primary Examiner* — Miranda Le
(74) *Attorney, Agent, or Firm* — AEON Law, PLLC; Adam L. K. Philipp; David Cohen

(57) ABSTRACT

To provide a system having a mechanism for viewing a plurality of electronic documents and adding notes at high speed and for preventing a plurality of users from accessing database files at the same time. The system for organizing document data includes a database program for managing one set of database files provided for each of users, a display program for generating data to visualize a part or all of a table where the one set of database files is described, and a viewer program for displaying the data generated by the display program on a screen of each user terminal. The database program has a function for loading a part or all of the one set of database files into a memory of the user terminal and for having a virtual database in the memory.

16 Claims, 15 Drawing Sheets

(51) Int. Cl.
*G06F 16/182* (2019.01)
*G06F 16/22* (2019.01)

(56) References Cited

U.S. PATENT DOCUMENTS

| | | | | |
|---|---|---|---|---|
| 8,949,769 B2* | 2/2015 | Biehl | ............... | G06Q 10/06 |
| | | | | 717/122 |
| 9,881,170 B2* | 1/2018 | Morris | ............... | G06F 16/188 |
| 2002/0016800 A1* | 2/2002 | Spivak | ............... | G06F 16/353 |
| | | | | 715/239 |
| 2004/0205644 A1* | 10/2004 | Shaughnessy | ........ | G06F 16/958 |
| | | | | 715/255 |
| 2011/0041054 A1* | 2/2011 | Bendik | ............... | G06F 16/93 |
| | | | | 715/234 |
| 2012/0151438 A1* | 6/2012 | Bach | ............... | G06F 16/164 |
| | | | | 707/740 |
| 2013/0297559 A1* | 11/2013 | Bailor | ............... | G06F 21/6227 |
| | | | | 707/608 |
| 2014/0181198 A1* | 6/2014 | Motes | ............... | H04L 67/06 |
| | | | | 709/204 |
| 2014/0359465 A1* | 12/2014 | Litan Sever | ........ | G06F 3/04817 |
| | | | | 715/738 |
| 2015/0026222 A1* | 1/2015 | Litzenberger | ......... | G06F 16/152 |
| | | | | 707/804 |
| 2015/0281292 A1* | 10/2015 | Murayama | ............ | G06F 3/0481 |
| | | | | 715/753 |
| 2017/0132428 A1* | 5/2017 | Kirigin | ................. | G06F 21/645 |
| 2017/0185753 A1* | 6/2017 | Yang | ....................... | G06F 21/10 |
| 2019/0205050 A1* | 7/2019 | Koorapati | ............. | G06F 16/183 |

OTHER PUBLICATIONS

Apr. 14, 1998, pp. 121-132, pp. 121-132, non-official translation (Okazaki, Toshihiko, "Usage Guide for Norton Utilities 3, Windows Version", 1st edition, Ohmsha, Ltd.).
Unix Magazine, Mar. 1, 2002, vol. 17, N0.3, 185th ISSUE.pp. 128-133, p. 128, LEFT Column, Non-Official Translation (Miyashita, Kensuke, "Guidebook of Unix 26").
Notice of Reasons for Refusal dated Sep. 23, 2020 in the corresponding Japanese Patent Application No. 2020-520670.
International Search Report issued for PCT/JP2019/046643.

* cited by examiner

*Fig. 1*

| Title | Author | Creation date |
|---|---|---|
| First brief | Plaintiff | H30.4.5 |
| Second brief | Plaintiff | H30.5.5 |
| Third brief | Plaintiff | H30.7.10 |
| Fourth brief | Plaintiff | H30.8.20 |
| Investigation report | Police Taro | H28.1.10 |
| Investigation report | Police Taro | H29.5.9 |
| Investigation report | Police Saburo | H29.5.9 |
| Investigation report | Police Taro | H28.1.10 |
| Investigation report | Police Jiro | H28.1.11 |
| Investigation report | Police Jiro | H28.1.12 |
| Investigation report | Police Taro | H28.1.12 |
| Investigation report | Police Jiro | H30.3.10 |
| Investigation report | Police Saburo | H30.11.10 |
| Statement | Statement Taro | H30.3.10 |
| Statement | Statement Taro | H30.6.20 |
| Statement | Statement Saburo | H30.4.10 |

*Fig. 7*

Project Folder

C:¥Dropbox¥ Civil Case ¥Kyoto Case Project

Folder Structure

Kyoto Case Project (root)
      - Document
         - Statement_id1.pdf
         - Brief_id2.pdf
         - List of Fees_id3.pdf

- program Data
         - master.sqlite
         - usernameA.sqlite
         - usernameB.sqlite
         - usernameC.sqlite

*Fig. 8* documents table
- id
- title
- date
- author
- codes
- memo
- link
- filesize
- num_pages
- textdata
- created_at
- updated_at codeinfos table
- code_id
- code_name
- display_name
- created_at
- updated_at

*Fig. 9* document updates table
    id
    doc_id
    key
    value
    created_at
    updated_at

Studying course of events on October, 21, 2018 edit   delete

The course of events on October 21, 2018 can be summarized as follows.
    First, X moved to his house (Document ID 15400). Next, Y visited there (Document ID 12000, ID 937), and Z makes a statement contrary to this (Document ID 400). However, it seems to contradict the point XX (Document ID 6256)...

add comments

*Fig. 15*

User file notes table article_code
    title
    body
    author
    user_name
    created_at
    updated_at notecomments table comment_code
    article_code
    body
    author
    user_name
    updated_at
    created_at

SYSTEM FOR ORGANIZING DOCUMENT DATA

RELATED APPLICATIONS

This application is a U.S. national phase entry of and claims priority to PCT International Phase Application No. PCT/JP2019/046643, filed Nov. 28, 2019, which claims priority to Japanese Patent Application No. JP2018-226110, filed Nov. 30, 2018. The entire contents of the above-referenced applications and of all priority documents referenced in the Application Data Sheet filed herewith are hereby incorporated by reference for all purposes.

TECHNICAL FIELD

The present invention relates to a system for organizing document data to provide all functions related to organizing, analyzing, and sharing electronic documents, such as prompt registration of electronic documents, management of bibliographic data, comprehensive search and viewing of documents as well as editing of meta-data (particularly adding notes) of the documents performed in a quick and continuous (repeated) manner, and sharing of such data using existing environments in an integrated manner.

BACKGROUND ARTS

The present invention is widely applicable to any type of business, while having been originally developed with one of the important purposes for supporting document organization in legal practice. To clarify the problems and the significance of the invention, explanation based on specific tasks is useful, and thus, the present invention will now be described particularly referring to legal practice and then the significance will be generalized.

A vast amount of document materials are handled every day in legal practice, and the document materials referred to are the following:
(1) copies of documents sent by an attorney (attorney-at-law) to opponents or courts (paper documents or PDF files);
(2) paper copies of documents submitted to courts in the action, suit, lawsuit, or litigation by the other party;
(3) paper copies of numerous in-house documents given to the attorney by the client;
(4) electronic data, such as Word, Excel, and PDF file, sent by the client as email attachments; and
(5) documents such as precedents and research papers.
They may be simply referred to as "documents" below.

The tasks of attorneys are typically processed in terms of "matters" or "cases" (hereinafter referred to as "case"). A single case generally contains tens or hundreds of documents and sometimes thousands or tens of thousands of documents, which can amount to an enormous amount.

Such a vast amount of documents are preferred to be in electronic form for efficient processing. Paper original documents need to be converted into PDF files to prepare electronic documents, but digital original documents will be used without any processing.

In standard legal practice, such electronic documents are stored in appropriately classified folders (directory) in file format (file+folder system).

CITATION LIST

Patent Literature

Patent Literature 1: Japanese Unexamined Patent Application Publication No. 2009-009551
Patent Literature 2: Japanese Unexamined Patent Application Publication No. 2006-004298

SUMMARY OF INVENTION

Problems to be Solved by the Invention

Such "file+folder system" as described above cannot satisfy the functions required for legal practice, but an electronic system for effectively managing and utilizing such a huge amount of electronic document files (hereinafter referred to as simply "electronic document", which can include or be associated with images or other digital data) is not known. Many attorneys have struggled with managing and utilizing of the electronic documents.

The technical problems that the present invention seeks to solve can be organized into those at the individual level and those at the team level.

I. Problems at Individual Level

1. Characteristics of how to Handle Documents

There are several characteristics of the way attorneys handle document materials.

(1) Linking Notes

First, thought, transmission, preparation of documents or the like by an attorney needs to be respectively supported by specific document materials. The attorney adds many notes, which require to be clearly linked to specific document materials, for a particular case to accumulate findings (knowledge) regarding the case (hereinafter, a note which the findings are written in and linked to a particular document by an attorney is referred to as "linked note").

(2) Originality

Second, the document material needs to retain its originality. For example, the attorney must not write anything in or edit the document material when submitting it to the outside as evidence.

(3) Lack of Individuality of Names and Enormous Bulk

Third, documents typically can amount to enormous bulk, and additionally their names lack individuality. Examples of their names (titles) include "briefs" and "investigation report", from which the contents cannot be assumed. To make the matter worse, the documents with the (same) title can amount to hundreds, thousands, or tens of thousands. (FIG. 1)

(4) Identification Method

Fourth, in the light of the third conditions, documents in legal practice are generally identified by combining a plurality of meta-data (bibliographic data). In this case, three elements: title, author, and creation date are typically combined, and the number of sheets may be added. In a lawsuit, a document code called an evidence number that is a combination of a symbol and unique number, such as "Exhibit A-10", is attached for convenience of identification, and this document code is also used together. FIG. 2 illustrates an image of the bibliographic data.

(5) Continuous Comprehensive Search

Fifth, an attorney typically repeatedly searches for one document but only views it for a short time. In other words, the attorney needs to search out significant descriptions for a particular purpose among the whole document materials in order to assemble the findings. However, the third conditions (lack of individuality of names) typically prevent the attorney from judging whether the document is desired unless the document is opened and the contents are read. In addition, each document material is typically relatively short and the information amount described is also small, nevertheless the attorney typically has to repeatedly view a plurality of documents at high speed to comprehensively search for particular documents.

A system for organizing electronic documents useful to attorneys should satisfy such characteristics.

2. Problem of File+Folder System

The "file+folder system" generally used in legal practice does not satisfy the requirements desired, and in particular, following problems will occur:

(a) Difficulty in Accumulating Findings

As described above, it is indispensable that the attorney adds notes linked to particular documents (linked note) while studying documents but cannot add such notes in the "file+folder system". The only place where the note can be substantially typed (information can be added) for a file is only in its file name, but change of the file name is inconvenient for both viewing and editing and pollutes the file name. On the other hand, the method of writing down findings in a separate text file requires another description for identifying each document, leading to a great deal of work.

(b) Difficulty in Retaining Originality

It is common to start an executable file for viewing editable data such as Excel file and Word file, but there are risks such as changes in the update date and erroneous editing.

(c) Difficulty in Managing Bibliographic Data

Since information can only be added to the file name, there is a limit to the amount. Addition to it, bibliographic data, such as creation date, title, author, and document code, cannot be segmented (information cannot be structured). Correction or improvement of bibliographic data is also typically neglected because of the complexity of changing file names, and the number of sheets is rarely managed, either. Furthermore, the "creation date" data of a file is only a time stamp, and the date may not correspond to the creation date described in the document.

(d) Difficulty in Search Based on Bibliographic Data

Due to the above reason (d), bibliographic data is not structured and thus cannot be individually searched or sorted.

(e) Difficulty in Content-Based Search

When linked notes cannot be managed, the only clue for search and visual selection is the file name with a title lacking individuality (or a little bibliographic data). Content-based comprehensive search such as searching for "documents describing the scene of the accident" is impossible.

(f) Delay in Viewing

To open files, the attorney has to wait for a given executable (PDF reader, Word, etc.) to be started and additionally can open only a few windows of the executable at most. This leads to a fatal delay to comprehensively search for a single document among a vast amount of document groups with names lacking individuality. The preview function provided by the OS is also inconvenient.

As a result, an attorney's review of electronic documents may be only extremely inadequate and slow, in view of the comprehensive search ability and the density and speed of thought that are essentially required. These inconveniences in management, comprehensive search, and viewing, as well as the repeated interruptions in thinking caused by them have been a bottleneck in the intellectual production of attorneys.

3. Drawbacks on Existing Technology

The existing general document management systems do not solve such problems. These systems are mainly focused on lifecycle management (e.g., storage period management) and workflow management (e.g., approval or decision) of in-house documents and do not sufficiently meet the needs of attorneys, such as management of bibliographic data (e.g., document codes) and quick and continuous search, viewing, and editing of meta-data.

Case management systems for attorneys are available but have not changed the situation better. Some of them do not even have document management capabilities at all.

4. Objective of the Present Invention

The present invention sets out to solve the above problems in an integrated manner.

The present invention provides a data management function for storing electronic documents retaining the originality in the system and for registering, editing, and searching for necessary and sufficient meta-data (especially bibliographic data and linked notes) of the electronic document. In terms of the interface, the present invention provides a display function allowing users to continuously comprehensively search, view, and edit a large number of documents at high speed without screen transitions.

In this way, the present invention achieves three core operations in document review in a quick, flexible, and seamless manner: (1) machine search and visual selection of documents; (2) viewing of document contents; and (3) addition and editing of meta-data on the basis of the above operation.

II. Problems at Team Level

Several attorneys typically engage in one case or public-interest activity (collectively called "project") together ("in a team"), and thus the above function for organizing document data is desired to be extended so that the team can use the function. In other words, it is desirable that users under the respective different environments can use the same data in the same manner. Of course, the results, which have been edited by each member in different environments at respective timings, need to be integrated and retained without contradiction. Another (second) problem of the invention (problem at team level) is involved in a method for achieving the objective.

1. General Awareness of Attorneys for Storing Electronic Documents

Regarding the general awareness of attorneys on how to store electronic documents, the following is characteristics:

(1) Need to Avoid Storing Documents in the Cloud

The documents handled by an attorney typically contain a large amount of personal and sensitive information, and thus the attorney needs to avoid storing electronic documents in the cloud (i.e., entrusting confidential information to external service providers) as much as possible.

(2) Need to Retain Files

The attorneys retain a vast amount of documents, which need to be copied and modified as needed, and, for example, tens of documents also may need to be printed at one time. Thus, the attorneys feel the inconvenience for the system making files invisible, for example, the configuration that all electronic document files are stored on the web and each file needs to be downloaded one by one to bring the files available.

(3) Need to Store Files Locally

It is very important for the attorneys to store (retain) files locally. In the situation described in (2), "folders+files" are preferred to be stored locally. The documents having high confidentiality may require to be handled only locally, and electronic documents with a very large file size (e.g., 50 MB) are also preferred to be stored locally to ensure the viewing speed.

None of them are absolute, but the system "forcing" use of the cloud will be contrary to the attorneys' needs at least. A typical browser-based document management system or the like is also contrary to the attorneys' needs.

2. General Form of Project

Given the above, practical process of attorneys' projects will now be described. FIG. 3 illustrates this schematically. In many cases, the number of project members ranges from about 3 to about 20.

(1) Stand-Alone Project

First, an attorney may work on a project single-handedly, as shown in Project (a) of FIG. 3. For the single-handed project, the confidential information does not need to be uploaded online, and thus the data likely to be stored on the local terminal even to meet the needs to avoid the use of the cloud.

(2) In-House Project

Second, the attorneys may form a team in the organization (firm), as shown in Project (b) of FIG. 3. Common law firms are small with less than 10 members, and thus dedicated system is difficult to be built. In addition, the use of the cloud is preferred to be avoided, and not only attorneys but also clerks view the same documents. For this reason, the attorneys typically use an in-house Network-Attached Storage (NAS) (including VPN) to share documents in the firm. The team consisting only of in-house attorneys also generally uses the NAS for data sharing.

(3) Project Engaged by Two or More Organizations

Third, the attorneys may form a team engaged by two or more organizations, as shown in Project (c) of FIG. 3. In this case, the attorneys can neither use the in-house NAS or VPN, nor prepare a dedicated server only for one project. For such a project engaged by organizations, the attorneys thus typically use the file synchronization service (e.g., dropbox), and the data may be attached to emails or transferred via portable media such as USB flash drives and CDRs.

Required Form of Data Sharing

In summary, the two main forms of data sharing in legal practice are suggested to be "NAS" type and "file synchronization service" type. All the data also essentially need to be stored locally as necessary.

Members of a project may be changed every time, and it means that the form of data sharing can change depending on the project. For example, while one project uses the NAS, the other project uses the file synchronization service, as shown in "attorney 2" of FIG. 3.

A system for organizing document data for attorneys should have a mechanism that can comprehensively support all of these forms of data retention.

4. Technical Problems

A technical problem now arises.

General technology uses a form where all data is stored in a database server on the network (including the cloud) for data sharing among a plurality of people. However, if the use of the server on the network is forced, it cannot meet each of the aforementioned requirements for data sharing.

Thus, there is also a possible way to set up database files in the folder to be shared, assuming the use of the NAS or file synchronization service.

If the system is, however, configured to allow each user to access the same file on the NAS, in general technology, the database file, which one user is accessing, remains locked while the user is using the system. This makes the system unsuitable for simultaneous use by a plurality of users.

On the other hand, if edits performed in different environments conflict with each other on the file synchronization service, the results of the edits will not be integrated (if two or more edits conflict over one file, the file will be duplicated).

Alternatively, if two or more people simultaneously edit data using the database program extending the functions of the spreadsheet program (e.g., Microsoft Access), which known as an existing technology, the result cannot be integrated on the file synchronization service as well.

Still alternatively, the data copy using a portable medium allows each user to update the same database file, and thus each editing result cannot also be integrated into one.

In other words, the existing technology cannot meet the requirements of this case regarding the data sharing.

The second problem (objective) of the invention is to overcome technical problems in such data sharing and to comprehensively achieve the function for organizing document data described as the first problem in the above all data sharing configurations, and to further achieve the function for organizing document data at the team level as well.

Although the problems have been described herein assuming legal practice, it well be understood that such problems exist in not only legal practice but also other operations. Examples of specific operations that may have similar problems include teams or individuals of researchers, the material management for publishing and editing businesses, investigation committees or third party committees, civic groups utilizing information disclosure, the document arrangement for individuals, and document management for small organizations. In these operations, documents need to be organized and utilized, while being shared as needed.

In addition, any small organizations and teams always have problems with data sharing methods. The small groups typically store data locally and use the NAS or file synchronization services for data sharing. The users generally wish to use the existing environment also for managing and organizing documents. When the user engages in project-based tasks where organizing document is important and additionally handles confidential documents, the need to freely choose data sharing methods becomes even stronger.

Means of Solving the Problems

According to one aspect of the present invention, a system for organizing document data includes a database program for managing at least one set of database files provided for each of users, a display program for generating data to visualize a part or all of a table, the table being described by the one set of database files, and a viewer program for displaying the data generated by the display program on a screen of each user terminal.

The database program has a function for loading a part or all of the one set of database files into a memory of the user terminal and for having a virtual database in the memory.

The virtual database holds at least a storage destination path of an electronic document, the storage destination path is associated with a unique document ID assigned by the database program, and the electronic documents can be read through the storage destination path, which is dynamically generated by the database program or is an absolute path.

The virtual database also holds meta-data assigned to each of the electronic documents.

After each user completes writing, as input data for each user:

(1) the meta-data is written into the virtual database and then is written back in a database file corresponding to each user among the one set of database files; or (2) the meta-data is written in a database file corresponding to each user among the one set of database files, and then a part or all of the one set of database files is reloaded into the memory of the user terminal to rebuild the virtual database.

The virtual database is characterized to have a function for reloading the one set of database files at each predetermined event or timing and for updating data held in the memory (FIG. 4).

According to the above configuration, the present invention adopts a data storage method to use one particular database file (user file) assigned to each user, and the number of the database files may increase depending on the configuration (see FIG. 5. A master file will be described below). Each database file may be any files that can be written and read by the system, and any format including text files is acceptable.

While retaining meta-data and other information of documents on the above database file, the system allows a plurality of users to use the system at any timing and achieves consistent data sharing by: (1) rarely causing files to be locked by reading or writing operation; and (2) allowing only one user to write in a file. Specific characteristics are as follows.

The first characteristic of the system is that the loaded results of all or required part are loaded in a memory of each user file. In other word, in this system, the user does not access the database file on the disk for various data display and search processes after reading the user file and storing it in the memory. The system rarely causes the database file to be locked by reading operation.

The second characteristic is that this system integrates and structures the information read from each user file. The structured data created in this way in a memory is referred herein to as a "virtual database". This allows the system to process the data in the memory as if it were a single database system. For example, operations equivalent to SELECT, INSERT, UPDATE, and DELETE in SQL statements can be performed on the virtual database in the memory (FIG. 4, "Query α"), providing users with quick and flexible search and editing functions. Such suitable structuring is also a prerequisite for the characteristic that the system can continue operating without loading the database file.

The third characteristic is that this system adopts a method in which the results edited by each user are respectively stored only in the user files assigned to them (FIG. 5). This configuration allows only one user to edit a specific database file so that edits of the specific database file by a plurality of users do not compete with each other. This avoids simultaneous access to a single file in a NAS configuration and also avoids editing conflicts to the same file in the file synchronization service configuration. Even in a configuration where data is copied using portable media, the results edited by individual users may be independently stored.

The present system typically behaves as follows on the basis of the above.

First, the system loads all the user files at startup (the lock time of the database file is about 10 milliseconds). The system builds in a memory a virtual database based on this data. The system provides the user with the functions to view and search the meta-data of documents, but all necessary meta-data and query processing functions are provided by the virtual database (no disk access is required. "Query α" in FIG. 4).

For example, one user A using the system edits meta-data of a certain document ("Operation" in FIG. 4). Upon receipt of the editing operation, the system (mainly the viewer program) records the edited information into a user file (a) specific to the user A via the database program ("Query β"—"Read/Write" in FIG. 4). At this time, the database file is locked, but this is usually limited to around 10 milliseconds.

To reflect the update results in the virtual database, there is a way to reload all user files, i.e., to rebuild the entire virtual database ("Read/Write"—"Build" in FIG. 4). Alternatively, only the relevant data on the virtual database may also be directly changed (edited) in memory ("Query α" in FIG. 4).

Even if another user B is using the system at the same time, the user B's operation can maintain consistency with the user A's operation. In other words, the user A's operation rarely locks the database file, and thus it does not prevent the user B from loading user file (a) to build a virtual database. In addition, the editing results of the user A do not interfere with the editing work by the user B, i.e., editing of a user file (b), because the user A edits only the user file (a).

The final synchronization is then achieved as follows (FIG. 6). The user A edits the user file (a), and then the user file (a) in the user B' environment is synchronized at some point (at the same time as shared in the case of the NAS). At this point, user B's system is allowed to recognize the result edited by user A. Then, the user B's system loads all the user files, i.e., rebuilds the virtual database, and then the result edited by User A is reflected by the user B's system (the virtual database is up-to-date).

As is clear from the above configuration, a significant (days or weeks) delay in the synchronization timing of the user file of a particular user does not essentially affect the operation of this system, because this means only the result edited by the particular user is not reflected, meaning nothing more than that. The specific configuration of the database file and the algorithm for reading and structuring it will be described according to the embodiment of the present invention.

In summary, the system according to the embodiment of the present invention uses the file synchronization service or NAS to simply synchronize several database files as a method of data sharing, but the system as a whole behaves like a single database system having transaction processing functions.

In this way, the present invention solves the problems in the method of data sharing.

A few points will be added.

First, this system does not necessarily need the write permissions of user files to be restricted. It is possible to give edit permission to other user files to a certain user or at a certain time, or the system itself can operate without any write restrictions allowing strict integrity to be sacrificed.

To streamline data management, it is effective to prepare a database file that stores data common to all users in addition to the user file (described in detail as the "master database file (master file)" in the embodiment).

Second, even if a plurality of users edit the same record at the same time, the processing of this system does not fail. The results of record edited by each user are saved independently in their respective user files. The details will be described according to the embodiment, but the system can settle conflicts in user files with flexible rules. For example, all the results edited by different users are also easily combined and displayed. In addition, it is typically effective that only the differential information of the edited record is recorded in the user files.

Third, this system assumes that one team typically includes only a few to some tens of members at most. The number of people who can run the system at the same time is even more limited. In addition, the purpose of the system is to organize documents, and thus editing operations occur only once few seconds at most per user. Accordingly, it is not expected that the database file should be locked frequently enough to interfere with the system operation.

Fourth, the time required by this system to load a database file is less than 10 milliseconds per file, and, for example, the team including slightly more than 100 members is not assumed to disturb starting and basic operation of this system. To increase the number of people who can operate the system, the frequency of loading disk files can be limited. In other words, this system achieves data display through a virtual database, and results edited by users can also be reflected (recorded) directly in memory, i.e., in the virtual database as well ("Query α" in FIG. 4). Even if the frequency of loading the database file is considerably reduced, the system can practically operate without problems. This system may be designed to prevent file access conflicts by a plurality of users or to prevent operation from slowing due to frequent loading of many database files.

Fifth, as is clear from the data storage mechanism, the system can operate even as a stand-alone system, and the number of users can be one.

Furthermore, the present invention sets out to provide a function that enables comprehensive search and viewing of electronic document as well as editing of them in a quick and continuous (repeated) manner. For this purpose, the viewer program should be designed to provide all the functions of narrowed search based on meta-data, viewing of documents, and editing of meta-data in a single window without screen transition. In specific configuration that can be suggested to be effective, a compact search input field is provided at the uppermost part of the screen, and a table is plotted below it to display compact bibliographic data listed approximately one item per line, in which, additionally, document images can be immediately viewed through the bibliographic data and the records can also be edited directly through the bibliographic data field. For the document image display function, it is effective to have both a function to display the image in the same window (the size should be about half the screen size) and a function to display it in a separate window in a larger size.

According to the aspect of the present invention, the system for organizing document data includes a function to, when a new electronic document is registered in the virtual database, extract necessary meta-data from a character string contained in the file name of the new electronic document on the basis of a predetermined analysis rule.

According to the aspect of the present invention, the system for organizing document data further includes a function to, when a new electronic document is registered in the virtual database through the viewer program, analyze a character string input by the user of the user terminal on the basis of predetermined analysis rules (e.g., "regular expressions") and extract the necessary meta-data.

In this case, the meta-information to be extracted may at least include the creation date and title of the electronic document.

The viewer program may be configured to have an input field for inputting text data by the user of the user terminal and to enable meta-information extracted from the file name of the electronic document to be displayed in the input field in advance. The viewer program may also have a function to display the contents of the electronic document to be registered at a viewable and readable size in the same screen without screen transition, while displaying the input field where the meta-data to be registered is input.

The viewer program may have a function to list the registered electronic document in a table format and may be configured to display all meta-data regarding one electronic document per line in the table. In this case, the viewer program may further have a function to perform a narrowed search based on the meta data of the registered electronic documents.

The viewer program may have a function to edit at least one of the meta-data of the electronic document to be registered through mouse operations on the table displayed on the screen.

The viewer program may have a function to allow the user to edit meta-data in a single screen without screen transition and to display the document image on the same screen or on a different screen in a viewable and readable size through mouse operation.

According to the aspect of the present invention, the system for organizing document data may be configured so that a customizable document code including branch numbers may be assigned to electronic documents in a one-to-many manner.

The viewer program may list buttons for all or some document symbols in a single view screen and may have a function for narrowing down the documents in the table to the documents having the document symbols through click of the button.

Advantageous Effects of Invention

According to the aspect of the present invention, the system for organizing document data provides the following functions for electronic documents: registration of documents (registration of meta-information and retention of electronic document files); high-speed and flexible comprehensive search of documents (machine search and visual selection); seamless review of the electronic documents searched for; editing of meta-information based on the review results (editing of bibliographic data and addition of notes); and creating reports associated with a plurality of documents in an integrated manner. In addition, the system can process a large number of documents in a flexible, quick, and continuous manner.

This is incomparably more advantageous than the "file+folder system" in the operation of continuously comprehensively searching, viewing, and analyzing a vast amount of documents to accumulate findings. It is also more advantageous than general document management systems that do not take document organization and analysis support into consideration.

Furthermore, this system adapts to all the basic forms of file-based data storage and sharing (local storage, NAS, and file synchronization services) without setting up a dedicated server and can perform data synchronization. In addition, the system behaves like a single database system having a transaction processing function. This can also satisfy the security requirements of small organizations, for example, a request for using their existing environment as it is or for holding all data within their own organization. If the user selects a configuration allowing the user to hold all data locally, all operations, such as searching, viewing, and editing, will be particularly fast.

As a benefit of the data sharing feature, users can accumulate findings for the project in the system one after another, thereby greatly increasing the intellectual productivity of the team.

As described above, the system for organizing document data according to the present invention strongly supports the operation of organizing and analyzing electronic documents performed by individual users and enables the users to share data in various existing environments, greatly improving the intellectual productivity of individuals and teams.

The present invention also provides a specific solution to avoid locking of database files when a plurality of users are working on the same database. This enable the system to behave like a single database system by simply sharing and synchronizing the database files of each user. The present invention advantageously makes the form of data sharing in the operation of document management and organization systems greatly flexible.

BRIEF DESCRIPTION OF DRAWINGS

FIG. 1 is a view of an example of a document lacking individuality;

FIG. 7 is a view of an example of a folder structure according to the embodiment of the present invention;

FIG. 8 is a view of an example of a specific table structure according to the embodiment of the present invention;

FIG. 9 is a view of another example of a specific table structure according to the embodiment of the present invention;

FIG. 10 is a view of a "document DB" display (the core screen that provides functions related to organizing and analyzing of document data) according to the embodiment of the present invention;

FIG. 14 is a view of a screen structure example showing a single sheet of a report article according to the embodiment of the present invention;

FIG. 15 is a view of an implementation example of a table according to the embodiment of the present invention.

DESCRIPTION OF EMBODIMENTS

List of Terms

Figure 2:
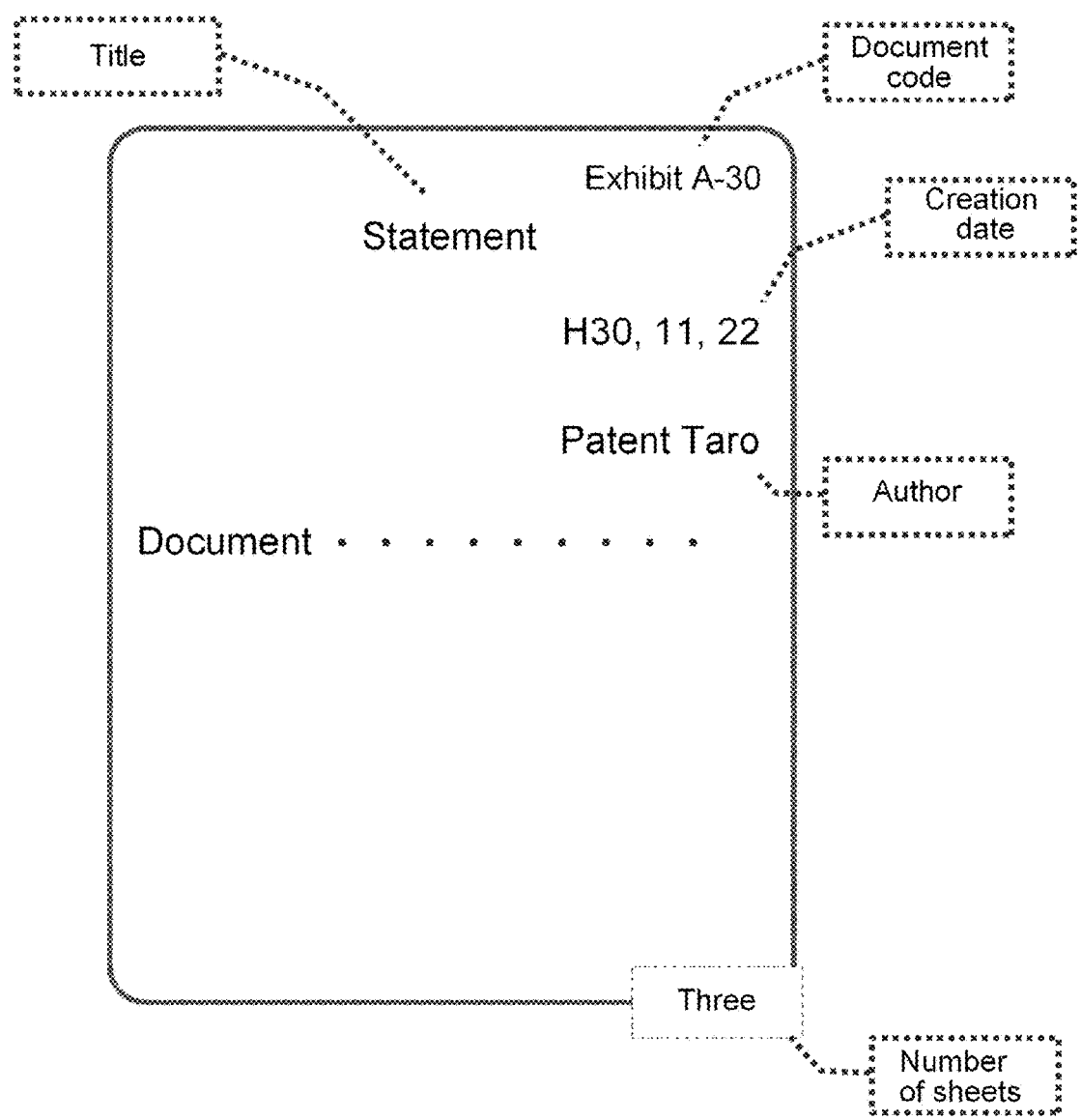
FIG. 2 is a view of an image of bibliographic data.

The following is a list of terms used herein. The definitions of the terms are also referred to herein as appropriate.

File+Folder system
    A method for managing electronic documents, in which electronic document files are stored in folders in accordance with appropriate classifications and no further technical manipulation or editing is performed.

Document ID
    A numerical value and/or character string data that is uniquely added to each document in the system.

Linked note
    Text data of the examination result of the document material, which is described by the user in a short form (generally 100 characters or less) and is associated with the document material on a one-to-one basis. It is regarded as one of the meta-data of the document.

Meta-data
    A general term that refers to additional information for information. However it refers to all information that is attached to documents on a one-to-one basis herein.
    Main examples: document ID, title, creation date, author, document code, the number of sheets of the document, and linked notes.

Document code
    Information that is added to a document by a combination of a symbol and a number. In some cases, only symbols are used.
    Specific example of only symbols: Exhibit A10 D Bibliographic data
    Information that may be used to particularly identify the document among the meta-data of a document. The six items: document ID, title, creation date, author, document code, number of sheets are basically assumed herein (document ID is prohibited to be edited).

Document search/visual selection/comprehensive search
    The process of searching for a particular document includes two process: (1) mechanical search using text or numerical data (display narrowed down); and (2) screening by visual examination of bibliographic data or document images. The term "search" herein to be construed in (1) mechanical search (equivalent to the display narrowed down in the system), and the term "mechanical" is added as needed. On the other hand, (2) is described as visual selection. The expression "comprehensive search" is construed in the entire process of searching for documents, including both (1) and (2).

Project
    A user may work on an activity alone or in cooperation with a plurality of people (e.g., a single legal case for an attorney). A unit of the activity that is the target of such efforts is collectively called a project.

Team/Member (Staff)
: When a plurality of users work together on a project, the whole of the plurality of users is defined as the "team". Each individual is referred to as a "member" or "staff".

File synchronization service
: A service (e.g., dropbox) having a function to store the electronic document file holding a folder structure into the cloud storage and to synchronize the folder structure and the electronic document file with a specified folder in the local terminal of the owner or user having sharing permission.

Project folder/Shared folder
: In a typical implementation, a folder that is set up one per project is called a project folder, which database files or electronic document files are stored lower than. It can be hierarchical, but basically the top level folder (root folder) is assumed. The project folder that is shared or synchronized among users may be called a shared folder.

Database file
: A readable and writable file to store information for each project. Basically, there are two types: master file and user file. SQlite is typically suitable, but a text file or the like is also sufficient.

Master File
: One form of database file, which stores the initial information common to all users in a project. It typically stores the bibliographic data of a document including the document ID.

User file
: One form of database file, which stores update information and other information for each user. In the case that a master file is not provided, the user file also holds the information that the master file holds.

Application folder
: A folder set up in a terminal to store the program and system settings when distributed programs (applications) are configured to be installed to the terminal.

Setting file
: A file set up in the application folder when distributed programs are configured to be installed in a terminal. It stores the basic information of the system, such as user name and list of projects to be managed. Any file format can be used, but a text file or SQlite is suitable. It is not the target of sharing.

The present invention is a system provided with the following A to C as its basic configuration of the embodiment.

A. Database Program

In the system according to the embodiment of the present invention, at least one database file (user file) is used per user. The user file is specific to each user, is placed in a folder used for data sharing, and is the target of synchronization. In addition to this, at least one database file (master file) holding the initial data common to all users is preferably prepared (but not required).

A single file having relational database functions represented by SQlite is suitable for the database file. However, any files that data can be read from and written in are sufficient, and text files are also sufficient to be used. As described below, the database program will have a function to load and write in each database file, as well as load and integrate them in a memory.

Figure 5:
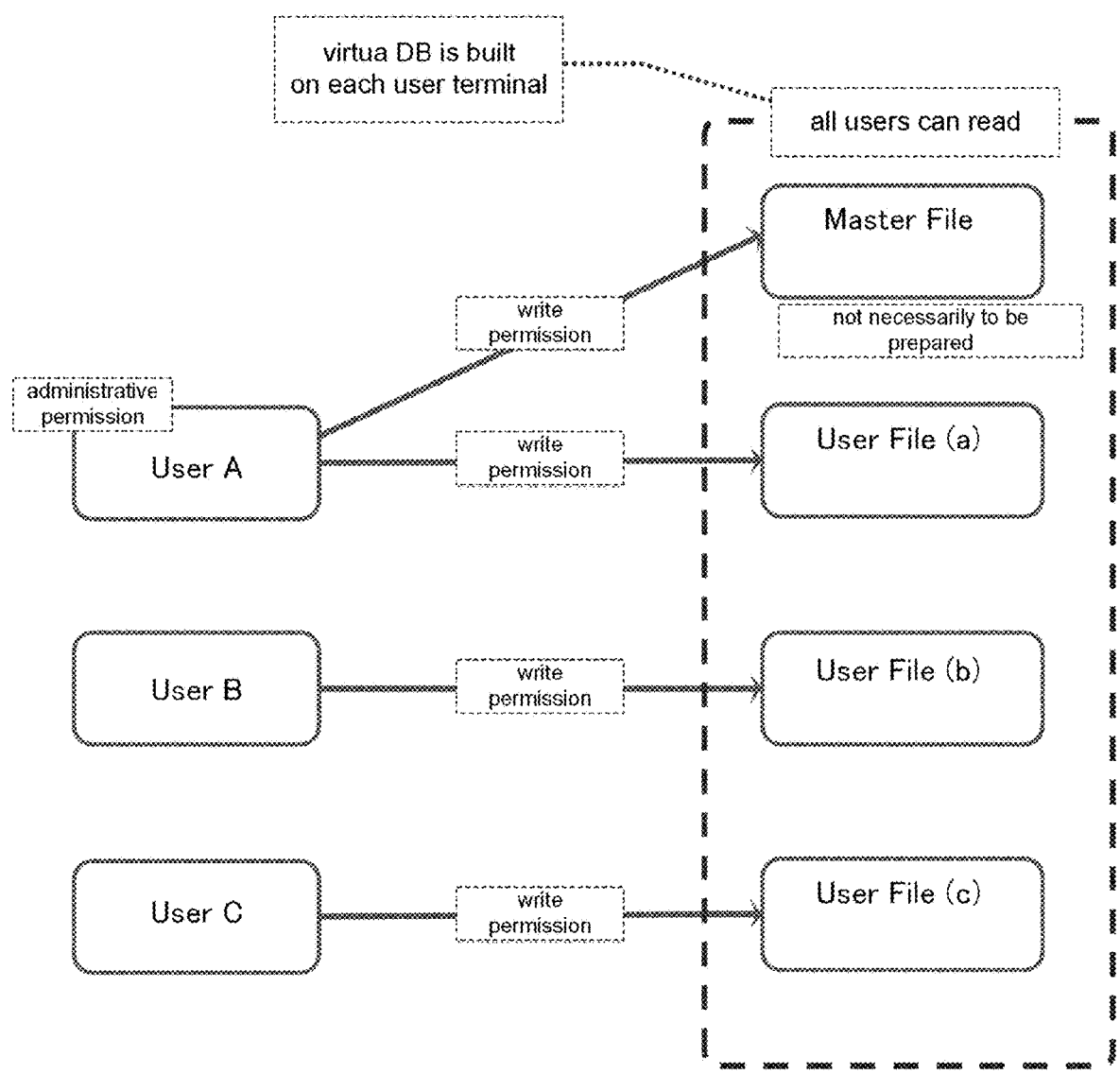
FIG. 5 is a view of a configuration adopting a method using user database files for their own that are assigned to each user one by the according to the embodiment of the present invention, and the number of the database files may increase depending on the configuration.
Figure 6:
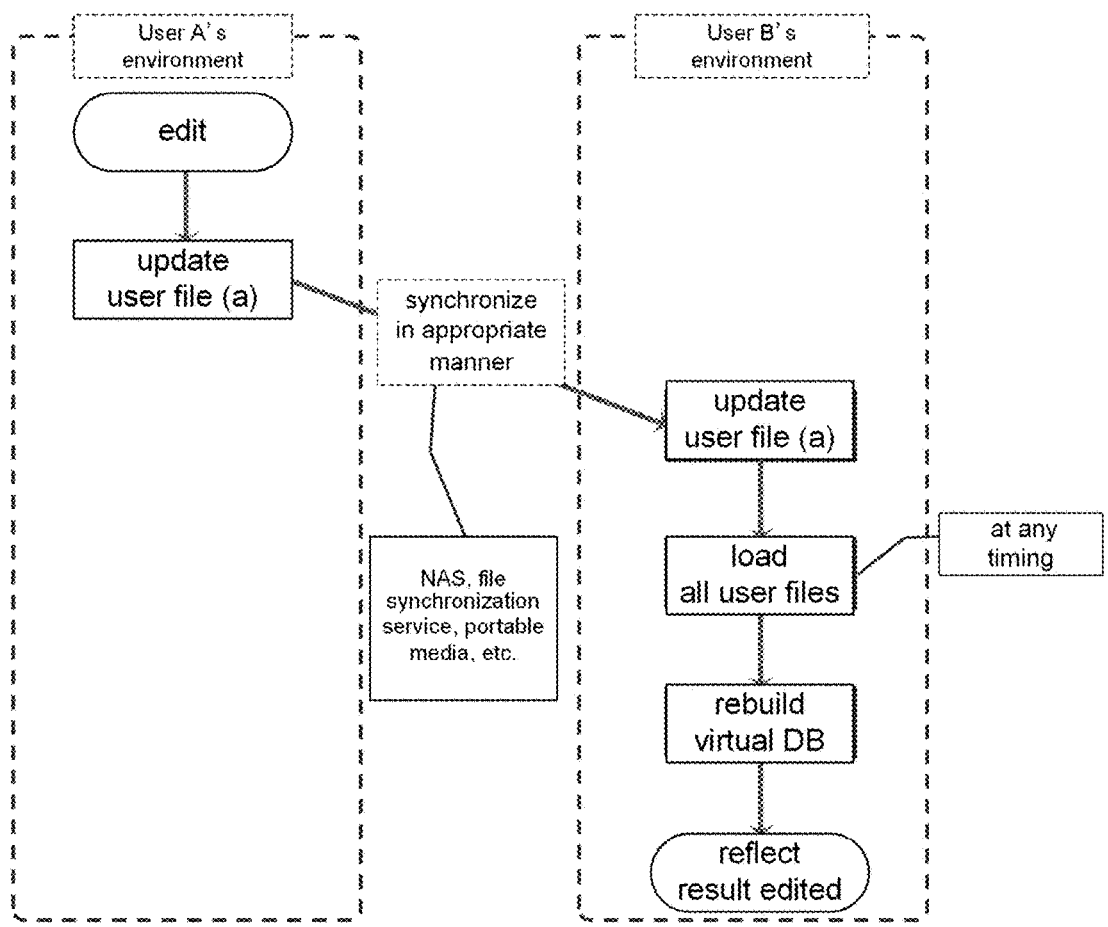
FIG. 6 is a view of a configuration illustrating a synchronization of a user file and its reflection in a virtual database according to the embodiment of the present invention.

Regarding access permission, all users have read permission to all database files (see FIG. 5). On the other hand, the right to edit the master file is limited to a single user with administrative permission (authority) in principle in order to prevent editing of individual files from conflicting. In addition, each edit permission of user files is in principle be limited to only the single user to which the file is assigned (even the administrative user do not have the permission to edit the user files of others).

Various meta-data and other information about the electronic documents shared in the team are stored in the database files. Assuming that a master file is provided, a unique document ID is assigned to each document by the database program when each document is registered, and is recorded in the master file. Then, various meta-data stored when the document is registered is linked to the document ID and is stored in the master file likewise. The core meta-data is assumed to be the bibliographic data (title, date, author, document code, number of sheets) necessary to identify the document as well as the linked notes. If one user then edits the meta-data through the system, the edited result is stored only in a user file assigned to the user.

In a configuration where a master file is not provided, each of the above information is stored in the user files. In this case, the document ID needs to be unique among the entire database file, and, for example, a unique PIN for each user may be added.

In any case, it is reasonable to store the electronic documents in file format in the folder and to record only the path information in the database file. Assuming that the path information is shared among a plurality of users, it is appropriate to use a relative path rooted at the shared folder.

The database program loads all of these database files (or some of them, possibly) at once, performs the prescribed integration process, and allows each memory of the local terminals to hold them in a structured form to build a database on each memory of the local terminals. The "database" loaded in the memory is defined as a "virtual database" herein. Although various data types and structuring methods for the virtual database in the memory are possible, in general, an associative array (a format in which values can be retrieved by keys) implemented in various programming languages is reasonable to be used.

When a user performs a search operation or the like on the system, the display program (described below) issues a data read query to the virtual database in the memory, and the virtual database responds to the query. In this case, the system accesses no database file on the disks.

On the other hand, if a user performs an editing operation or the like on the system, a data editing query is issued. Accepting this, the database program edits the user file on the disk and records the updated information (or may record it in the master file depending on the configuration and operation).

Here, the system can also directly update the memory with the records in the table held by the virtual database in advance. The use of this method enables the system to reflect the results edited by the user in the virtual database without reloading the database file. This also can reduce the frequency of locking the database file.

In this way, the database program locks the database file for a moment at two timings: (1) building the virtual database; and (2) reflecting the results edited by the user in the database file, whereas it does not lock the database file for most of the rest of the time. The database file is not locked for most of the other times. Even if a plurality of users use the system at the same time, reading, writing, sharing, and synchronization of the database file will not be disturbed.

Database files may be shared by the Network Folder (NAS) or synchronized by a file synchronization service. They may be copied in a peer-to-peer manner, or, if no network is available, through a portable medium such as a USB memory disk in a primitive manner.

Here, the electronic document is an electronic document stored in a predetermined data format, such as MS-Word, MS-Excel, and PDF, and the program for viewing these files must be installed in advance on each user terminal. However, common programs with viewing functions (e.g., a web browser) can also be used, and a dedicated executable program is not necessarily required.

The electronic documents can be stored in either the network folder in the local area network or the local folder in the user's terminal, as long as the path can be identified by each terminal.

The system needs to be able to identify the location of the electronic document data. The path of the electronic document is typically recorded in the database file (generally a path relative to the root folder of the project). However, the system can also dynamically generate the path of electronic documents (e.g., by fixing the destination directory and matching the name of the electronic document file with the document ID), and the path does not necessarily need to be recorded in the database file.

The configuration of storing electronic documents directly in the database file may also be adopted. In an example, SQlite allows binary data to be stored. In this case, the virtual database may hold the path to the database file where the electronic documents are stored or may dynamically generate the path, and the electronic documents can be loaded using the path. In this configuration, a dedicated database file for electronic document data storage is preferably provided.

In this way, database files specific to each user are held synchronizing between the user terminals, and the virtual database built in the memory of each user terminal enables all users to share the same table consistently without using a database server and to edit the table at any time.

B. Display Program

The display program is to issue queries to search for records in a database or for receiving search results and display them on the user terminal. One of methods to easily design it is to run a web server program (local server) on the local terminal. In this case, the web server program receives the data in the table from the virtual database, then generates the data necessary for the web browser to plot the view screen, and passes it to the web browser (data in HTML format may be passed directly, or HTML may be generated in the browser using ajax, etc.). The web server program is used because it can advantageously use the flexible expression capabilities of HTML, CSS, JavaScript (registered trademark), etc. The system is designed to support the use of locally stored files and thus does not use a web server externally set up.

Any display programs issuing queries to the virtual database or database program can be used and necessarily need neither to execute the web server program on the local terminal nor to convert it into a format that can be displayed on a web browser. As described above, the present invention is characterized to hold a plurality of database files on the local side computers and use them as a virtual database integrated in the memory (and to prevent the database file from being locked while the database fields is being editing). If the data loaded from all the database files can be loaded and held in memory, the same result can be obtained without a web server program, for example, by using various GUI libraries. In this sense, the use of a local server is an embodiment of implementation that is easily performed and highly useful.

C. Viewer Program

The viewer program, which corresponds to a protocol of a display program, communicates with the display program and has a function to load data and edit the recorded data from the virtual database through the database program. The web browser is available by any web servers provided with the display program using the http protocol. A dedicated program for viewing (graphical user interface program) corresponding to the display program may also be created.

The present invention sets out to provide a function to continuously search, view, and edit electronic documents at high speed. For this purpose, all the functions including search, document viewing, and record editing on a single screen without screen transitions are preferably provided. In specific configuration that can be suggested, a compact search input field is provided at the uppermost part of the screen, and a table is plotted below it to display compact bibliographic data listed approximately one item per line, in which, additionally, document images can be immediately viewed through the bibliographic data and the records can also be edited directly through the bibliographic data field.

Advantageously, in one example, a function for viewing document images configured to display the contents of the electronic document in half the size of the screen may be provided when the mouse is hovered over the name of the electronic document listed as a search result. To achieve this, some methods are possible and, for example, the display program accesses the electronic document file on the basis of the path information held by the virtual database, converts its contents into an image format, and passes it to the viewer program, which can display the image in a larger size on the same screen. In addition, a function for fixing the pop-up window and another function for enabling a full screen reading in a separate window may also be provided. Advantageously, the electronic document files held locally allows electronic documents to be viewed at high speed.

In a typical implementation, the display program (e.g., a local server) and the viewer program (e.g., a web browser) can be distinguished. For example, if a unique GUI program or the like is used, the functions of the display program and the viewer program may be configured to be substantially integrated in a single program. In one of embodiments, the display program and the viewer program may also be integrated accordingly. Considering the description of the present invention, the implementation method is supposed to be easy (substantially the same).

According to the above embodiment, individual users can always seamlessly repeat the basic operations, such as searching and viewing of documents and editing meta-data (editing bibliography and adding notes), in the system at high speed. This creates an advantage incomparable with the "file+folder system" in the operation of continuously comprehensively searching, viewing, analyzing a vast amount of documents, and accumulating findings. It also has advanced advantages over general document management systems that do not take "organizing and analyzing document data" into consideration.

All users can share the meta-data accumulated by each user through the above operation almost simultaneously, thereby greatly improving the intellectual productivity of the team. In addition, the system can adapt to the data storage environment, which may vary from project to project, to achieve flexible data sharing.

The above is the framework of embodiments of the present invention. The present invention will be now described in detail in connection with the embodiments. Each embodiment is one of the prototypes developed and is based on customized ones for legal practice. The main part of the functions can be applied to other practices as well, and thus it is sufficient that typical embodiments will be only showed.

Examples

I. Basic Hardware Configuration, Overall Configuration, Installation Method, Etc.

1. Hardware

This system is typically assumed to be used on general personal computers (PCs). In other words, a computer (e.g., a desktop PC or notebook PC) having a storage device (e.g., a hard disk), CPU, display device, and input devices (e.g., a keyboard and mouse) can be used as a user terminal.

Any hardware configurations, which can hold the necessary files and can execute programs, can be used and are not particularly limited (including the operating system (OS)). For example, it can be designed and programmed to be operated on tablets or smartphones.

The embodiment was performed on a PC on which Windows (registered trademark) 10 is installed, and this is one of the major use environments expected.

2. Method of Implementing Program

According to the embodiment, a (web) server program, which is running locally, and a web browser are used as screen viewer (hereinafter referred to as the "local server configuration") (described in detail below).

The inventor implemented the main functions including database file manipulation (operation), virtual database construction, and local server execution using python (and some libraries including bottle). These functions are not limited to python, but any general programming language can be considered to be implementable. The GUI was also implemented using JavaScript (registered trademark), assuming the use of a web browser.

The local server configuration is used because it has the advantage of supporting the flexible expressiveness and GUI functions of web browsers (HTML, CSS, JavaScript (registered trademark)).

However, the local server configuration is only one example of an effective and easy implementation. Any configuration having functions of manipulating database files, building virtual databases, and providing view screens can be used. Being written in Python, the use of the appropriate GUI library, for example, can eliminate a local server and a web browser in Python.

3. Software Setup, Etc.

The system according to the present invention typically assumes that a distribution program is prepared and installed on the user's terminal beforehand (however, configurations without pre-installation of software on the terminal are also possible, as described in Section 7).

In an embodiment, the installation program is distributed to the users. When the user executes the installation program, the system creates one folder for the system (hereinafter referred to as the "application folder") in a predetermined path in the user terminal, and places the configuration file for the program and system (hereinafter referred to as the "configuration file") in the folder. In the embodiment, SQlite is used as the configuration file, but a text file or the like is also sufficient.

In the embodiment, a distribution program itself includes the local server program. In addition, any common web browsers (e.g., Chrome) capable of executing JavaScript can be used, and thus the pre-installation of any software other than the distribution program is not requested to users.

Even if a scripting language such as Python is used, the source can be binarized (into an executable file) using various libraries and thus the Python interpreter also does not need to be installed beforehand.

4. Preparing Project Folder

The system according to the present invention assumes the document management in project units, and thus it is reasonable to prepare a single folder for each project, in which all the data in the project (database files and electronic document files) are stored.

In this configuration, the user prepares a single folder for each project ("project folder") to be used, and then boots the system and performs the necessary registration operations to make the system identify the project folder (in particular, the path of the project folder on the user terminal is recorded in the configuration file, and an "absolute path" is typically suitable for the path).

At this time, the system simultaneously performs the initialization process of the project folder (described below), enabling the system to recognize the project folder.

Then, it is reasonable to make the system access each file by a path relative to the project folder (root folder), and, of course, folders lower than the root folder can be hierarchical.

The following points should be added: (1) The project folder does not have to be prepared in advance by the user and may be generated by the system; (2) The above explanation assumes the creation of a new project, and the case of joining an existing project will be described below; and (3) Strictly speaking, the system can operate even if the project folder is not a single folder. In the possible implementation, for example, only database files are shared with the file synchronization service, sensitive electronic documents are held in the local folder, which is neither shared nor synchronized, and both folders are allowed to be identified by the system (each file is accessed by the relative path). However, such a configuration seems to be somewhat exceptional, and thus a single folder structure is assumed and described herein.

Project Folder Sharing

This system according to the present invention can operate as a stand-alone system, in which a project folder may be set up in a local terminal and used by a single person. The files in the project folder can also be synchronized by copying data using a portable medium or the like. However, if a team is working on a project, it is reasonable to share or synchronize the project folder itself Typically, the NAS or file synchronization service is used to share or synchronize the project folder among all team members. For the project using the NAS configuration, a specific folder on the network is used as the project folder and shared, and everyone accesses the same disk. For the project using the file synchronization service, the project folder is synchronized, and the target folder is placed in a predetermined folder on each user terminal and synchronized. In this case, users, which have respective different disks, do not access the same folder. The both are referred to as "shared folders" herein.

As a matter of course, the path of the shared folder can be different for each user terminal: for the NAS configuration, there will be differences due to network drive letter allocation, etc.; and for the file synchronization service, the location of the folder to be synchronized is optional.

In any case, the system is set up so as to recognize (register) the shared folder (root folder) to be used in the project for each user terminal.

6. Network Connection and Internet Connection

As described above, the system according to the present invention operates as a stand-alone system, and thus a network connection is not required. However, the use of a network is generally desirable for data sharing.

For the project using the NAS configuration, the project folder is located on the NAS, and thus connection to the network where the NAS is available is required in order to use the project.

For the projects using the file synchronization service configuration, the project folder is located locally, and thus a network (Internet) connection is not required. However, the Internet connection enables the data synchronization with a delay of approximately a few seconds to a few minutes.

On the other hand, as described above, even if there is a significant delay (days or weeks) in synchronization, it neither mean anything more than that the updated information of a particular user is not reflected in the system nor does not essentially affect the operation of the system. In this respect, there is a great deal of flexibility in the timing of the Internet connection in the file synchronization service. Both synchronization methods can provide a great deal of freedom in synchronization timing, allowing the synchronization at any timing.

Figure 3:
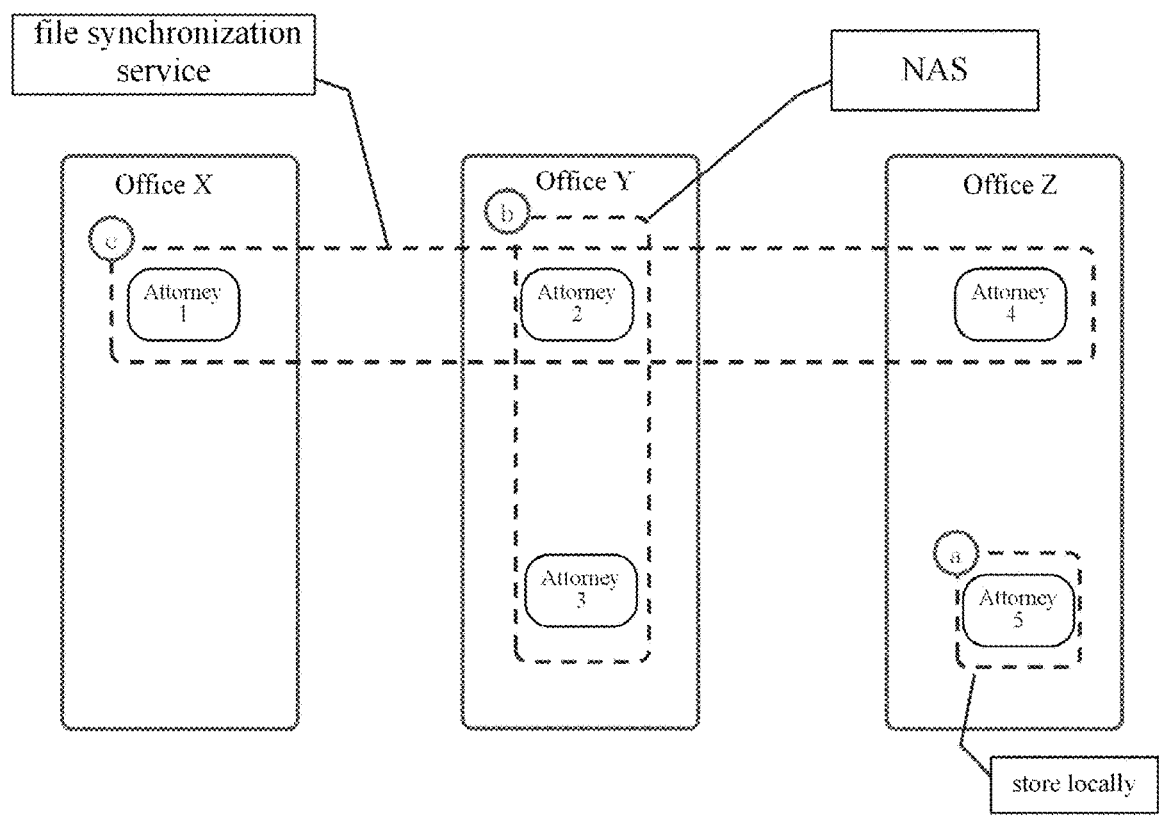
FIG. 3 is a schematic view of a general form of a project. The part (a) surrounded by a broken line illustrates Standalone Project, the part (b) illustrates In-house Project, and the part (c) illustrates Project engaged by two or more Organizations.
Figure 4:
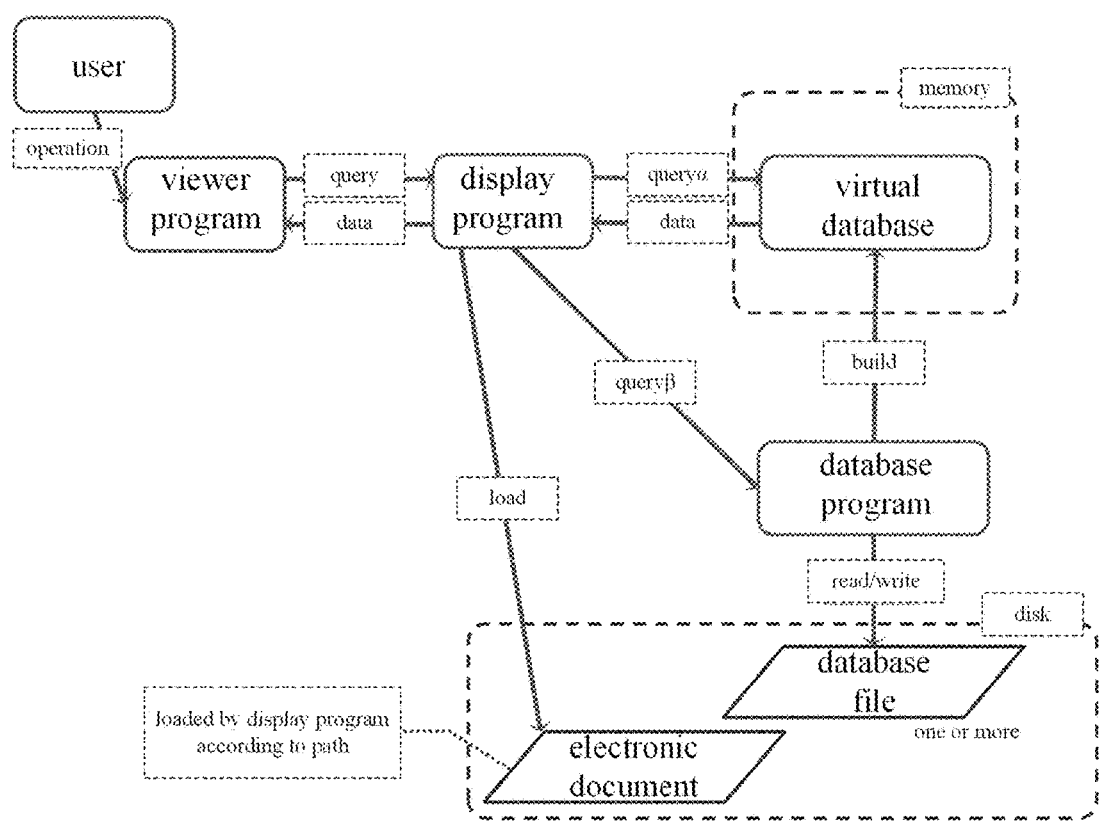
FIG. 4 is a view of a system for organizing document data according to an embodiment of the present invention.

Here, it is noted again that the method of sharing project folders can be different for each project. In other words, the system identifies the project folder by each path in the user terminal. Any project folders that can be identified by the path are sufficient, and whether the folder is on the NAS or locally is not important to the system. This allows the system to have the advantage of being able to adapt to a plurality of forms of data sharing (as above described, see FIG. 3 for the form of the project).

7. Configuration without Pre-Installation of Software

Strictly speaking, the program of the system according to the present invention does not need to be pre-installed on the terminal.

At least with common OS, the system can operate in a way that all the programs of this system are kept in the project folder. In this way, even users who are not licensed for this system have the advantage of being able to join the project immediately by simply sharing the folder. Examples of how to use this system include two configurations; a terminal installation type and a folder installation type. The user licensed for the folder installation type may enable unlicensed users to join the project in the manner described above, satisfying the need to keep the project open.

A user identification function can be achieved by a method that the user enter user information at startup or locally store the user information (e.g., cookies are sufficient for a browser).

As a derivative form, a viewer program only having a viewing function (prohibiting editing) may be designed to be kept in a shared folder, and this can also be another way to open up the project. When only a small number of users have edit permission, the system can also be used as a unidirectional means for information transmission.

II. How to Manage the Data

Next, a method for managing data according to the present invention will be described in connection with embodiments of application configuration files and database files.

1. Application Configuration File (Setup File)

As described above, the configuration file is set up when software is installed on the terminal and records the information necessary for system operation. In an embodiment, SQlite is used, but a text file or the like is also sufficient. The number of configuration files is optional, and the configuration file is not to be assumed to be synchronized with other users.

The major data assumed to be recorded in the configuration file is below.

Examples of Major Data in Configuration File
    Basic data
        User name
        Information used for license authentication
    Project related information (for each project)
        Project ID (unique within the terminal)
        Project name (optionally set by the user)
        Path to the root folder of the project
        Date of last access to the project Of particular importance is the project-related information. Retention of the information allows the system to implement project information management and switching functions (see below). However, the application folder itself may not be set up depending on the implementation method, such as the "folder installation type" described above.

2. Overview of Project Folder and Database Files

As described above, the system enable database files to be stored in folders (FIG. 5), which are shared or synchronized as needed. As is clear from the concept of projects described so far, the database files re prepared per project and are typically stored in an appropriate folder lower than the project folder (root folder).

As described above, any format of database file is acceptable, but from the efficiency of data management, it is reasonable to use a single file with relational database functions, typically SQlite.

The folder structure and the main information that should be recorded in the database file will be described below, assuming the form in which the master file is provided.

3. Folder Structure

FIG. 7 is an example of the folder structure. In the embodiment, C:¥Dropbox¥ Civil Case¥ Kyoto Case Project" is the project folder (i.e., the root folder), and two folders; "Document" and "programData" are placed lower than it (automatically placed at initialization).

The "Document" folder is assumed to store document file data (it is reasonable for the system to automatically copy or move files into the folder at the time of document registration).

The "programData" folder is for saving database files. In this case, "master.sqlite" is the master file, and "usernameA.sqlite", "usernameB.sqlite", and "usernameC.sqlite" are the user files (there are three users). In the embodiment, the user name is used for the user file as it is, thereby identifying the owner of the user file. Such method of identification needs the user name to be unique (generally to be linked to license management).

The above is an example, but it is reasonable to determine a certain folder structure in advance in the system and then initialize all project folders with the same folder structure.

Folders that are not used by the system can be used freely by users. For example, a folder, such as "Save Draft", can be created directly under the "Kyoto case project" to manage Word files for preparing documents. In this way, the system does not restrict the original function of shared folders in any way. As a result, users can set up this system as an extension of the conventional shared folder usage (i.e. it can coexist), and this is also a characteristic of the present invention.

In addition, since the electronic document files in the "Document" folder are normal electronic document files, they can also be manipulated by the user. For example, file manipulation including copying all the files to a portable medium and providing them to a third party, or printing out tens of documents can be easily performed at once on the folder. The flexibility to utilize folders and files in this way is also one of characteristics of this system.

4. Master File

The master file is a file for storing data common to all users. Examples of the data are shown below.

Examples of Main Data (Tables) in Master File
Document Table
   Document ID
   Title
   Author
   Creation date
   Document code
   Number of sheets
   Linked note
   Date registered/updated
   Full text information of Document
   Relative path to Electronic document file (with the project folder as root)
Document Code Table
   Document code ID
   Document code name (e.g., "Exhibit A")
   Short form of the code (e.g., "A")

FIG. 8 is an example of a specific table structure based on the above. The document code ("codeinfos" table) will be described in detail as a function for customizing the document code, and the full text information of the document will also be described below.

The information in the above tables is loaded into the memory when (before) the virtual database is built, and it will be the initial value of the virtual database. As described below, the updated information in the user file is reflected in this.

Document IDs must be unique within a single project but are allowed to overlap between different projects (document ID 100 in project A and document ID 100 in project B may be different documents).

5. User File

One user file is assigned per user. Example of data to be managed is shown below.

Examples of Main Data (Tables) in Master File
Document Update Information Table
   Update Information ID (primary key in this table)
   Document ID to be updated (e.g., 12000)
   Field name of the document record to be updated (e.g., title)
   Value after update (e.g. Statement)
   Date and time of update FIG. 9 shows an example of a specific table structure based on the above.

In the embodiment, information related to the report function is also recorded in the user file, and it will be described in detail in the report section.

The method for reflecting a user file to the virtual database in this system will be specifically described.

In the embodiment, the "document_updates" table is a table where the updated information of the meta-data of documents is recorded. For example, if a user updates the title of a document with document ID 12000 into "Statement" at 12:00 a.m. on Nov. 15, 2018, the table records "doc_id:12000, key: 'title' value: 'Statement' updated_at: 2018/11/15/12:00 created_at: 2018/11/15/12:00" in the same table. After this record is loaded into the memory, the program interpret it as "an update of the title (key=>title) of the document with document ID 12000 (doc_id) to "Statement" (value)" and also the update as "a query of Nov. 15, 2018 at 12:00 a.m. (updated_at)". Subsequently, the program updates the initial value of the virtual database.

Here, an editing conflict in this embodiment is a situation in which the updates with the same "doc_id" and the same "key" coexist in the "document_updates" tables of different user files. In the embodiment, problems caused by the conflict are resolved by adopting only the update information with the latest date and reflecting it in the virtual database. However, it can also be resolved with all the update information utilized and displayed together with the user names.

As described above, the information in the master file is loaded into the memory first, and the relevant data in the memory is changed (updated) according to the updated information (generally differential information) in the user file to build a virtual database with the latest information.

In the configuration without a master file, information that should be recorded in the master file can be recorded in the user file. In this case, the document ID should be unique throughout all user files, for example, by including a unique PIN for each user. In the virtual database, all document information contained in all user files can be combined into a single table. In addition, any unique document IDs can be used to record and reflect updated information in the same method described above.

6. Access Permission

Although access permission has already been described in detail (FIG. 5), in principle, each user has the permission to edit only his or her own user file, and only the administrative user has the permission to edit the master file. On the other hand, all users have read permission for all files.

7. Virtual Database

As described above, the virtual database in the memory is updated upon loading of the master file and user files. It is reasonable to load the files at a predetermined frequency or event, for example, when a certain period of time has passed without any loading, or when a user presses the reload button in the system (of course, the update frequency should be kept within a reasonable range to keep the database file locked for a very short time).

Here, the structure of the virtual database is described. As described above, a virtual database can be implemented in an associative array or the like. In this case, the data structure is typically the following.

Example Data Structure (Roughly Equivalent to a Document Table)

```
{...,
13000: {'author': 'PatentTaro',
  'codes': [[1, [30,0,0]],[3,[10,5,2]]],
  'created_at': '2018-09-21 09:24:49 +0000',
  'date': [2018, 9, 20],
  'id': 13000,
  'link': 'Document¥H300920Statement[ID16755].pdf',
  'memo': 'Accident Status',
  'num_pages': 3,
  'textdata': '(Text information of the document)',
  'title': 'Statement',
```

-continued

```
        'updated_at': '2018-09-21 09:24:49 +0000'},
    13001:{.....} ,
    13002:......
    }
```

In other words, the top-level key is the document ID, the second-level key is meta-data, such as title and date, and "Value" is the value.

The "codes" means document codes (details are described in VI. Document Code Function).

III. Structure of Viewing and Searching Functions

Next, with reference to a screen of the embodiment, the view screen (viewer program) is described, and a search function is also described.

1. Search and Table Display

Figure 10:
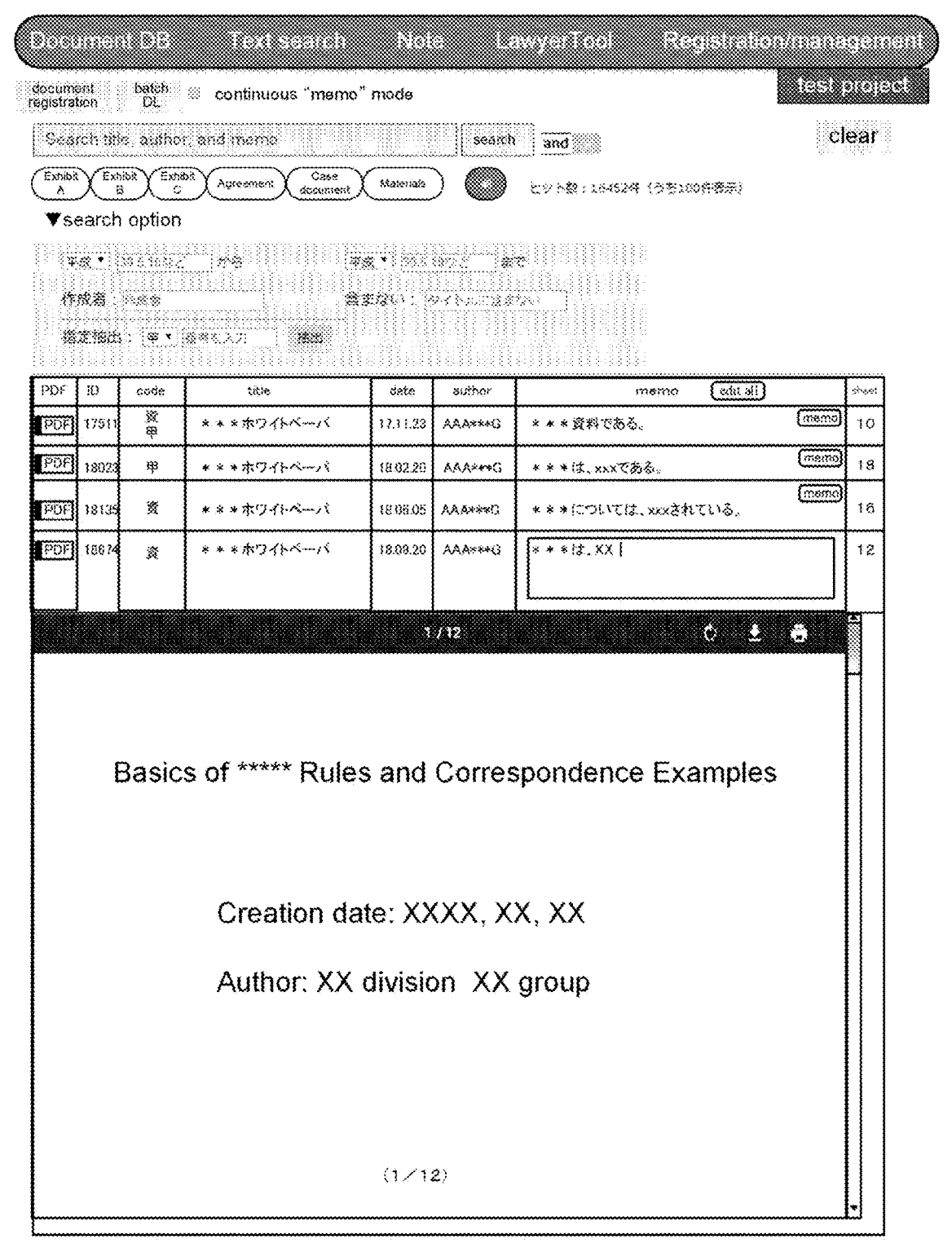

FIG. 10 shows the "Document DB" screen (the core screen providing functions related to organization and analysis of document data) according to the embodiment of the present invention.

A menu bar for page switching is provided at the uppermost part of the screen. The "Test Project" button in the upper right corner is related to the project switching function (described below).

A box with the notation "Search title, author, and memo (comments)" is a search box. When a user types a character string and press the Enter key, search operation is performed collectively on the basis of each information, such "title", "author", and "memo" (linked note), at once to narrow down the documents. There is also a sorting function by date, etc.

The "Search options" provides more detailed search methods, such as date designation and exclusion search. The buttons including "Exhibit A" provide a function to narrow down data on the basis of the code, and the user can open and close this area by clicking the "Search Options" button.

A method for implementing search and sort is roughly broken down into two types:
(a) Filtering and sorting an associative array in a virtual database and then passing it to the viewer program (query to the virtual database); and
(b) Filtering and sorting records already held in the viewer program (for example, executing a filter/sort function on a record group held as a JavaScript (registered trademark) array type in a browser memory, and replotting the table on the basis of the result).

In the embodiment according to the present invention, (a) is mainly used, but (b) is also used in some situations.

The table it the lower part is the area where the meta-data of the document is displayed. One document is assigned to each row of the table, which is suitable for listing a large number of documents. Each row displays linked notes as "memo" along with various bibliographic data.

In the embodiment, a maximum of 500 documents are displayed in an initial state (additional 500 documents are allowed). This search process is a retrieval of data in the memory (virtual database), and thus the operation does not slow even if a large number of documents are displayed at once. Since a large number of records can be displayed, it is advantageous when a vast amount of documents are handled (a few tens of records is not enough). This is also one of the characteristics of the present invention.

2. Document Viewing Function

In the section where "Basics of ***** Rules and Correspondence Examples" is showed, an image of the document is displayed (users can also turn the page to go on reading it).

In the embodiment, following three types of display methods are used.

The document image is not displayed in the initial state (only the meta-data is listed) in the embodiment.

Here, the user can display an image of the electronic document in the lower half of the table by mouse hovering buttons (e.g., "PDF" and "DOC") on the left side, as shown in FIG. 10. When mouse hovering is stopped, the image disappears. This can be used as a prompt preview function (the first display method).

To go on reading the document, the user left-clicks the button after mouse hovering the button. This causes the image display of the document to be fixed and the document not to be disappeared even if mouse hovering is stopped (the second display method). In the embodiment, the entire screen is being scrolled so that the document image is centered.

Both the first and second display methods do not need to hide the subsequent record display (lines) to display the document image. For example, after fixing the document image through the second display method, the user can scroll directly to check the subsequent records or can open additional document images. As a method to implement this, a "row (tr tag)" may be dynamically added just after the corresponding record in the table, and the image information may be embedded in it.

Furthermore, the user opens another window (or another tab depending on the browser) by clicking on the document combining it with a modifier key and can view the document in full screen reading on the window opened (the third display method).

With this configuration, the users can continuously view the document images at high speed when comprehensively searching for documents, and can sort out the documents required. It also allows users to review and analyze the contents during the above operation, if necessary.

3. Meta-Data (Record) Editing Function

In the embodiment according to the present invention, a meta-data (record) editing function is provided on the same screen.

Figure 11:
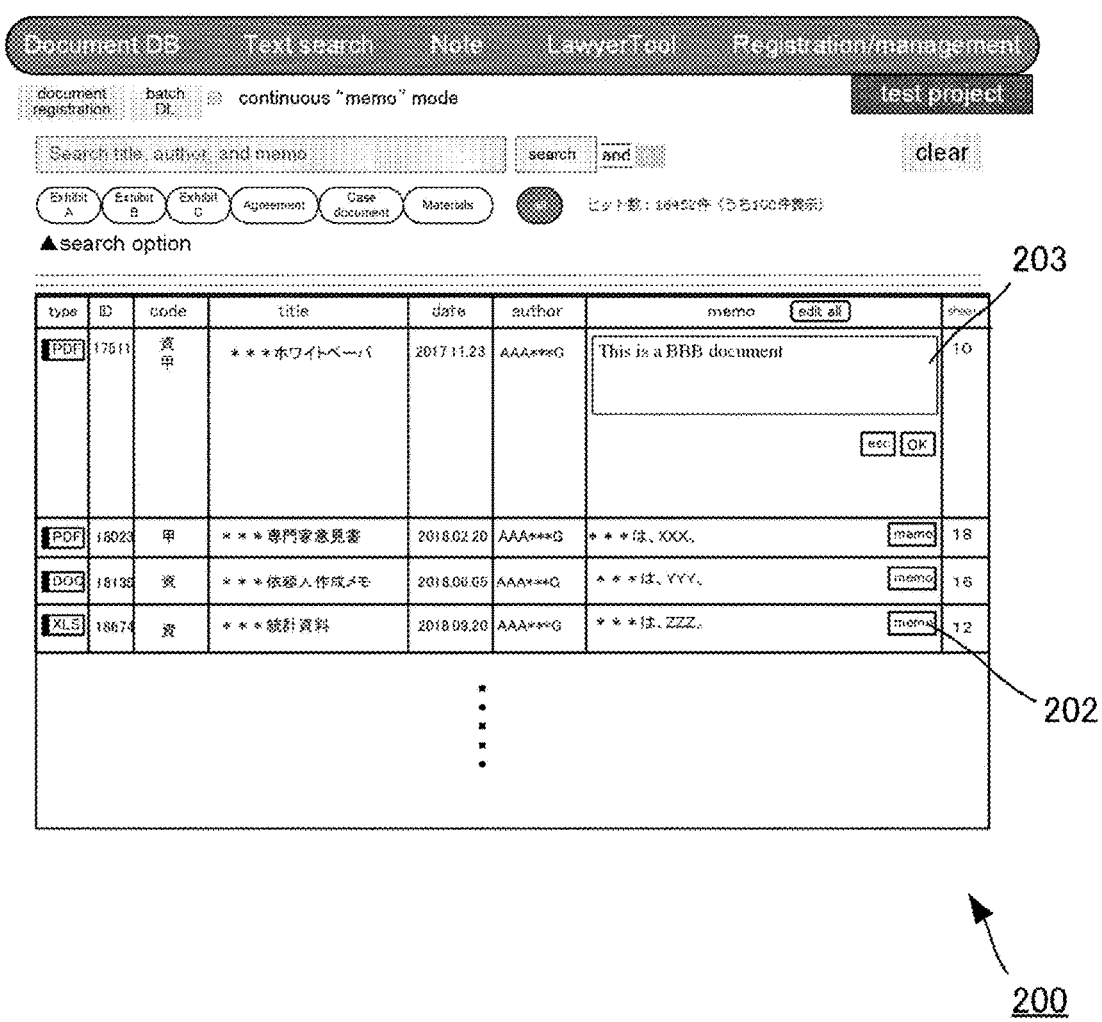
FIG. 11 is a view of a screen structure example for a note function according to the embodiment of the present invention.

FIG. 11 illustrates a screen structure example related to a note function. The user can open an input window 203 by clicking a button 202 in FIG. 11. Here, the user edits text data and clicks an OK button (or presses the Enter key) to determine the edited content.

In the embodiment, at this time, HTML data held by the browser in the memory is immediately rewritten (by JavaScript (registered trademark)). This enables the user to keep continuous editing at high speed without forcing the user to wait while records are edited (the user waits for neither updating of the database file nor even updating of the virtual database).

In the embodiment, a query is issued to the database program to update the user file on disk parallel to the above. At the same time, the virtual database is also updated in the memory, and only the relevant data is rewritten (in FIG. 11, only the value in a "memo" key of the record with ID 17511 is changed into "This is a BBB document").

If the update of the user file fails (the system detects an error), the browser data and the virtual database data are restored at that point (backed up in the memory in advance).

The user can open a similar editing window by double-clicking the document code, title, date, or author opens, allowing the user to edit it.

In the embodiment, the system adopts the configuration of storing database files and electronic documents locally (including the use of the file synchronization service together).

Compared with the method of using a database on a server (which is on a network and also has disk access), the configuration speeds up the operation in all aspects, including document search, record editing, and document image display.

4. Full-Text Search Function

In addition, it is desirable for the system to have a full-text search function. The full-text search function is effective in searching for the desired document among a vast amount of document groups.

First, the system implements a function for extracting the text information of the document and recording it in a database file when the document is registered. The extraction of text information can be implemented by using an appropriate library according to the file format.

Preferably, the text information is also loaded into the virtual database at the same time (since it is simple text data, it is unlikely to put a high pressure on the memory). The system implements a function for displaying the full-text search results in response to the various search processes in the system.

In addition to the function for displaying images of documents, it is preferable for the system to have a function for displaying text information. It is also preferable that a function for searching for a predetermined keyword of the text information to extract and display information in a predetermined number of lines (e.g., five lines) before and after the line that matches the keyword or to display only the number of matched result. Such an extraction process can be implemented, for example, by dividing the text information by line breaks, organizing it into an array format, extracting the element containing the keyword and the five elements before and after the keyword, and concatenating them.

IV. Specific Flow of Use by Teams

The case where a team uses the system in the embodiment according to the present invention together with the file synchronization service will now be simulated.

Assumptions

In the embodiment, registration of electronic documents is authorized only for an administrator user. Initial information of the documents is recorded in the master file and permission to edit the master file is completely limited to the administrator user only.

Simulation

A typical flow is described below.

First, one administrator user creates a folder (project folder) to be used in a project. The administrator shares the project folder with the team members (general users) by performing prescribed operations in the file synchronization service. In addition, the administrator user registers the folder to the system by performing prescribed operations in the system on his/her terminal.

Here, the system in the administrator user terminal performs initialization, such as setting up a master file in the above folder (initialization of the project folder), and registers the path of the project in the application configuration file (in the installation folder). This allows the system in the administrator user terminal to recognize the project (and the location of the folder).

On the other hand, the file synchronization service has synchronized the project folder to the local terminal of the general users. In this case, the general user specifies the shared folder on his terminal system and performs a participation operation of the project. This makes the system on the user's terminal to set up a user file with the user's name in the folder and to recognize the project ("join" the project). This user file is also shared with all users through the file synchronization service.

As the administrator user then proceeds with the document registration process, the bibliographic data of the documents is recorded in the master file as needed and the electronic document files are also stored in a predetermined folder. Both the master file and the electronic document file are synchronized to the local terminals of all users through the file synchronization service. This allows each user's system to display the documents.

Once a certain number of documents are registered, the users start searching, reading and analyzing the documents on their own systems. In this step, the users can improve the description of bibliographic data, write notes, etc. through the view screen at any time. All of these edits to the meta-data are recorded in the user file (user file (a)) of the user (user A). The updated user file (a) is shared to all users' terminals through the file synchronization service as needed. This allows other users to read the updated user file (a) and then to reflect the edits by user A to the virtual databases of their own system. With the file synchronization service, the delay is generally a few seconds to a few minutes.

On the other hand, with considerable flexibility in the timing of synchronization as described above, for example, users can work offline and synchronize it a few hours later or the next day.

In this way, all users can freely use the system at any time to accumulate findings. Of course, all users benefit from the system's quick and continuous search, viewing, and editing functions, and thus they can work efficiently, achieving a high level of intellectual productivity as a whole team.

When a new user requires to be added, the (project) folder is allowed to be shared with the new user through the file synchronization service, the folder is specified in the system installed on the new user's terminal, and a predetermined participation operation is performed.

V. Project Management and Switching Function

The function relating to the management of the project will now be described.

1. Basic Concept of Project

As described above, the present invention is assumed to be used in a plurality of projects.

In general, projects are characterized to be highly independent. In other words, the documents in a project have a deep relation with each other, while the documents in project A rarely are used in project B.

Thus, it is also reasonable to make the management of documents in this system independent for each project. The tables of the documents (database) are prepared independently, per project, and document IDs independent for each project are also assigned. In this case, the numbering of document IDs is also done on a project-by-project basis (i.e., document ID 100 in project A and document ID 100 in project B are different documents).

The system enables each project (operation) to be distinguished clearly. For example, when the user engaging in a certain project performs a search operation, the operation is targeting only the documents in the engaged project in principle. In addition, the system prevents information of other project to appear unless the user clearly performs a switching operation (unless the user's screen is the administrator's one). This is effective to keep the user's operation simple and fast as well as to maintain the user's concentration.

It is desirable that the project-related functions of this system should be implemented on the basis of these principle ideas. Such ideas are not found in common document management systems (where the user can freely perform operations in various folders without barriers).

2. Project Switching Function

Figure 12:
FIG. 12 is a view of an interface for a project switching function according to the embodiment of the present invention.

FIG. 12 illustrates an interface for a project switching function implemented in the embodiment according to the present invention, and it is placed in the upper right corner of the screen.

The part (button) with "Kyoto Case" indicates the current project name. When the user mouse hovers this button, other projects are displayed below (e.g., Personal Research (Local) and In-house Document Management (NAS)). The embodiment also provides a search function by project name (enter text in the box "Search by name" to narrow down the display).

The user selects and clicks the name of a target case to switch to the project of the target case.

At this time, the database file is reloaded, and the virtual database of the project is rebuilt in the system (in the embodiment, the virtual database holds records of only the active projects in a memory).

Then, the table display of document information, etc., is also replotted for the selected project.

3. Project Management Function

Together with the function described above, a management function for projects is preferably provided. This can be achieved by allowing the user to edit settings (allowing the user to reflect the edit by the user to a setting file of the application) with an appropriate management screen provided in the system. In the embodiment, the screen transition is performed by clicking of "Add/Edit" at the bottom of FIG. 12.

Typically, three functions: (1) Create/join New project; (2) Re-specify Project folder path; and (3) Change Project name are provided.

(1) "Create New project" corresponds to an initialization of a project folder by an administrator user as described in IV. "Join" corresponds to registration of the initialized project folder, corresponding to the participation operation of the project by general users as described in IV.

(2) "Re-specify Project folder path" deals with the case where the path of the project folder is changed afterwards (e.g., change of the shared folder name).

(3) The project name can be freely specified by each user. The project name is saved in the configuration file. However, the configuration file is not synchronized, and thus each user can name the project oneself and can edit the project name any time through the system screen.

VI. Document Code Function

In managing and organizing documents, it is an important function that a document code is held as bibliographic data. Not only in legal practice, but also in relatively large companies, organizations, and government offices, document codes are typically attached to in-house documents, and even individuals or small teams may need their own reference codes to be introduced. Thus, it is desirable that the system should maintain sufficient management functions for the text codes.

1. Basic Requirements

A document code is a combination of symbols and numbers. In addition to this basic form, the following three points need to be considered.

(1) A plurality of document codes may be added to a single document.

(2) The types of codes vary depending on the projects.

(3) The "branch number" is used for the document code number (e.g., A10-2).

The system needs these needs to be met.

2. Data Storage Method

As described above, it is necessary for the system to be able to customize the document code as needed, rather than fixing it. For this reason, the document code is not written in the program but can be managed externally.

In the embodiment according to the present invention, it corresponds to the document code table described in "Master File" section (FIG. 8: "codeinfos" table).

Reposting

Document Code Table

Document code ID

Document code name (e.g., "Exhibit A")

Short form of the code (e.g., "A")

The document code name is a designation of the official document code ("Exhibit A"), and the short form of the code is the abbreviation of it ("A"). In a general description method, the short form is concatenated with numbers (e.g., A10). The abbreviation is used for display in the document list table and for analysis of file names (described below).

As described above, document codes are assigned document code IDs, and thus data is primarily managed with document code IDs in both a "documents" table (master file) and tables in the virtual database.

The final data structure on the virtual database is [1, [10,5,2]] (=[document ID, [basic number, branch number 1, branch number 2]]). For example, the document ID 1 "A" is interpreted as A10-5-2 (branch number).

Although there are various ways to hold data, in the implementation of the embodiment, character string data such as "[1, [10,5,2]]" is recorded in the "codes" field of the "documents" table (JSON format), and then the data is reinterpreted into an array format in the program.

3. Related Functions

The function of customizing the document code by the user can be achieved by implementing a function for preparing an appropriate management screen and for allowing the user to edit the document code table through the screen. The result of this editing is generally immediately reflected in the virtual database.

In addition, a search function for document codes is preferably implemented in the document view screen ("Document DB" in the embodiment). In the embodiment, a radio button displayed with the document code name is placed directly below the main search box, and the click of it can immediately narrow down to only documents with the corresponding document symbol. Only the documents with specific document symbols are commonly needed to be viewed together, and thus the function to switch with a single click greatly enhances convenience.

In addition, the search function using specified symbols and numbers is provided in a search option area.

VII. Document Registration Function

Next, a document registration will be described.

This system assumes a vast amount of documents to be registered. In one example, the registration of 10,000 documents takes 83 hours for 30 seconds per document and 28 hours for 10 seconds per document, leading to a big difference. In addition, the registration process may be typically tedious, and the psychological comfort of the registrant needs to be taken into consideration (it also affects the work efficiency). Thus, the system is preferably to provide sufficient support for the registration process.

In the registration process in the conventional technology, a plurality of input forms are provided for each bibliographic data, and the user is typically asked to fill in the data for each form (referred to as "form transfer method"). However, this method requires the user to move from one form to another form several times by mouse clicks, leading to time loss and uncomfortable work. On the other hand, only the file name and timestamp not any bibliographic data are used in another method. This does not meet the need to register bibliographic data.

A more rational and effective technology is required.

Function for Using File Name Information

For the general practice of electronic document file names, a certain amount of bibliographic data is typically written in the document file names along with the title. An example of the common file name in practice is following.

A50H301105Statement.pdf

This includes the document code "A50", the creation date "H301105", and the title information "Statement". There is no specific convention (rule) for naming the files, but description ways has been similar conventionally. In addition, since neither the document author nor notes is typically described, document file names except for the document code and creation date typically correspond to the title.

Such a typical file name can be studied by their structure and analyzed using regular expressions to separate off bibliographic data, thereby greatly improving the efficiency of the registration process. In addition, it allows the information in the file name to be utilized without any editing, avoiding waste.

2. Adoption of Single Input Form Method and Input Rule

On the other hand, the common technology for an input method, a form transfer method involving difficulty for use, in which the users have to input data repeatedly moving through many input forms.

As described above, file names have a certain degree of regularity and can be analyzed using regular expressions. In this case, a possible solution is to make the input form a single one, and the input form should inherit the file name. The user enters and corrects text data according to input rules, which are ahead of the above conventional description method (so-called "solid typing"), and then the system automatically analyzes it as bibliography information, establishing an input framework. This input framework can be expected for users to input overwhelmingly faster than the form transfer method.

An embodiment of this analysis rule (i.e., input rule) is described follow.

Analysis (Input) Rule

Document code: Document symbol character followed by a numeric value

Example: A120, B15, D30

Creation date: consecutive six or eight numerical numbers under some accompanying conditions (major patterns are exemplified below)

Example: 20171121, 171121, H291121, 2017.11.21, H29.11.21

Author: characters followed by @

Linked note: characters followed by >

Title: all character strings that do not correspond to the above are regarded as the title The above is only a gist, and some elaboration is preferred to prevent misrecognition.

3. Embodiment

An embodiment of a screen is described below. In an example, it is described to take the case that an electronic document with a file name: "Three Suggestions for Improving List of Evidence (*Hanrei Jihou*) 171121.pdf" is registered.

Figure 13:
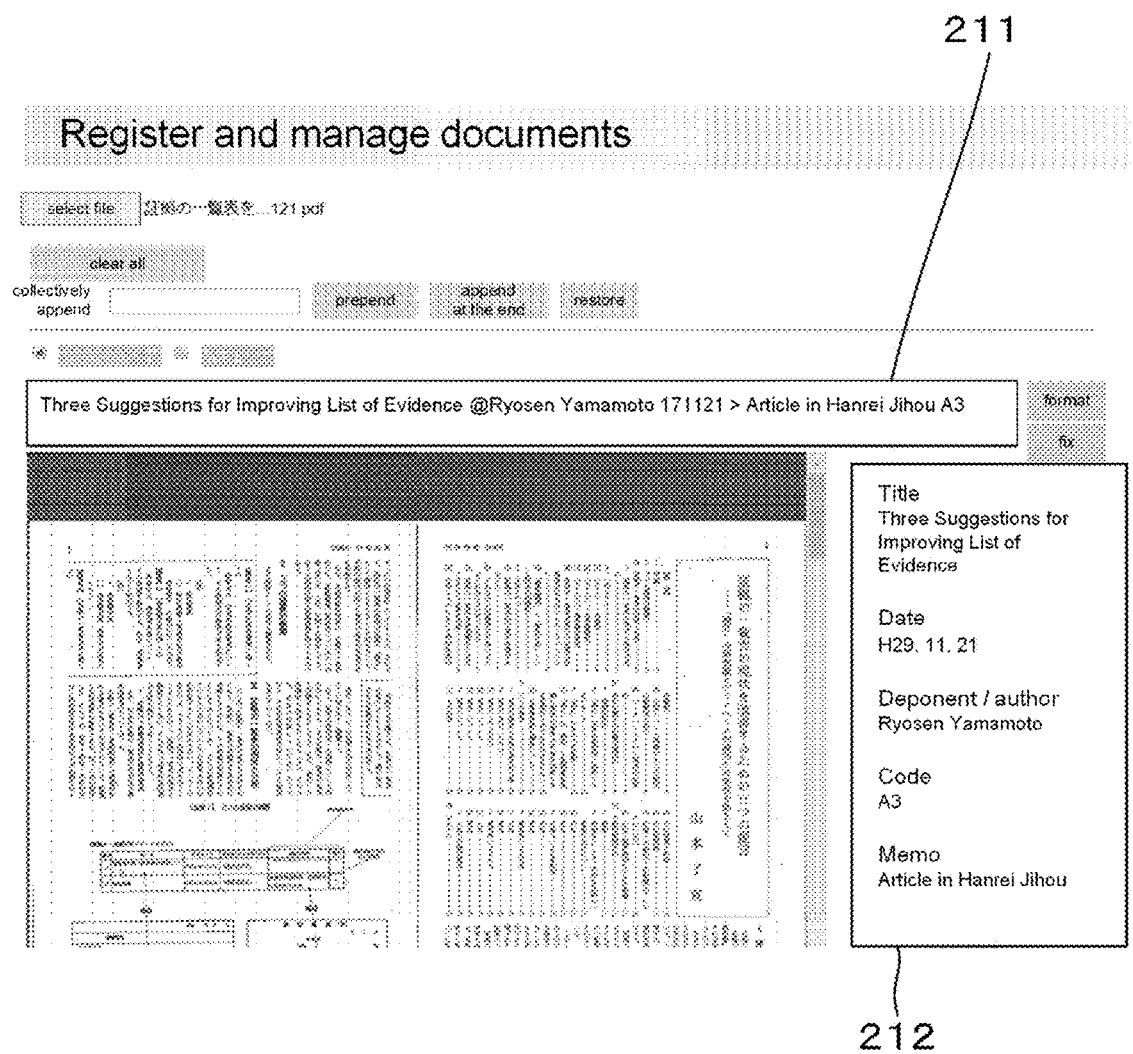
FIG. 13 is a view of an example of a screen display during registration of an electronic document according to the embodiment of the present invention.

FIG. 13 shows the screen display example during the registration process. First, the user selects the file to be registered by clicking "Select File" on the screen shown in FIG. 13 (it is desirable to allow a plurality of files to be selected simultaneously).

This causes the system to recognize the file name of the file, and the system then reflects the file name (excluding the file extension) as it is in the input field 211. The system analyzes the text data in the input field 211 using regular expressions, extracts the required meta-data, and reflects it in the display field 212.

Furthermore, the user can directly edit the text information in the input field 211. Here, it is preferred for the system to constantly monitor the input field 211. In the embodiment, it is implemented in such a way that the analysis result of the display field 212 is updated in real time every time the user edits one character.

In an example as illustrated in FIG. 13, when the user finishes typing "Three Suggestions for Improving List of Evidence @Ryosen Yamamoto 171121>Article in *Hanrei Jihou* A3", the analysis results as in the input field 212 are displayed. When the user presses the Enter key, the registration of the document will be completed. If the user selects a plurality of files at the time of file selection, the screen display will be immediately switched to the next document and the user can continue to input continuously.

General systems using the form transfer method requires a lot of time and labor to transfer forms. In addition, the contents of the document may not be displayed during registration. However, the method of the system according to the present invention can consolidate the input form into one, and the user can quickly enter bibliographic data from the document image according to simple and clear input rules. Furthermore, the editing result can be visually checked immediately. Once a user gets used to the system, he or she can register documents in a few to ten seconds per document, achieving much faster registration than that by conventional systems.

4. Expansion to Automatic Registration System

Furthermore, system is preferably to have an automatic (or semi-automatic) registration function for documents. In particular, the possible method is: (1) the user immediately completes the registration process by selecting the file(s); (2) the screen for confirming the bibliographic data is displayed after the file(s) are selected, and then the user completes the registration after making simple corrections; and (3) the system patrols (checks on) a specified folder and automatically registers the files there into the system.

For example, when only a few files are to be registered, it is typically easier to write the bibliographic data directly in the file name than to start the system's registration screen. When a large number of files (e.g., several hundred) with bibliographic data already written are inherited from outside the system, it is expected that the files can be registered in the system at once by using the bibliographic data written in the files.

In this case, the above input rule also works effectively.

As described above, a general file name typically includes the three elements: date, document code, and title, and the pattern of date and document code has generally been established. Accordingly, the date and document code will be recognized correctly in most cases even if the naming person does not know the input rules of this system, and all other information will be registered as a title. In a typical implementation of this system, the "title", "memo", and "author" are all searched together, and thus this is not a big problem. (The "A" and ">" are rarely used, and the risk of misidentification is low)

On the other hand, the naming person knowing the input rules of this system can use the input rules directly into the file name as well, and it can be, for example, the file name "171121Three Suggestions for Improving List of Evidence@Ryosen Yamamoto.pdf". This is the advantage that the task of entering bibliographic data can be separated from the system screen. In other words, the user can enter bibliographic data (structured data) through the file name (which is unstructured text data) without starting the system. This makes the method and timing of bibliographic data entry more flexible and convenient. It is convenient that the registration process can be completed by simply operating on the folder. When bibliographic data entry is committed to an external service, it is only necessary to pass them the PDF file and ask them to change the file name according to the input rules.

5. Correspondence with Code Customization Function

The system provides a customization function for document codes, and thus the above analysis rule is preferably to be designed to correspond to the customized codes. In particular, the regular expression is dynamically generated on the basis of the customized code information recorded in the table (shortened representation of the code).

In addition, although the above specific embodiment has assumed legal practice, the same framework can be easily applied to other industries. The embodiment also allows for customization of the document code, and thus any combination of document symbol+number can be interpreted. Furthermore, the date description method is generally the same in other industries, and the embodiments according to the present invention can be applied to any type of business by arranging the bibliographic data managed and the input rules.

6. Registration Right Holder (Authority) of Document

In the embodiment according to the present invention, a document registration authority is limited to an administrator user. However, when the system is configured to allow the user to directly register document information into each user file without a master file, the document registration authority is not required to be limited. In the case where a master file is prepared, data registration by all users can be achieved by temporarily registering documents in user files and then transferring the temporarily registered information to the master file when an administrator user starts the system.

VIII. Report Function

1. Significance and Concept of Report Function

The linked note function of this system is to be recorded and displayed as a short comment on an electronic document, and it can only correspond to electronic documents on a one-to-one basis. Accordingly, the note function alone cannot be used to describe a detailed analysis of a group of electronic documents, and thus the function for creating a report associated with a plurality of electronic documents is preferably to be provided. It is highly valuable to be able to share long reports having text-searchable contents particularly in team.

The report may be associated with a plurality of documents, or it may not be associated with any of the documents. The basic relation between a document and a report is many-to-many. The report may be represented in the configuration including holding text in a database record or associating the held data based on IDs. Any additional digital data such as image data included in the report can also be embedded in the text as a link (including automatic generation), assuming HTML to be used.

2. Basic Functions and Saving Format, Etc.

The basic function preferably implements new posting, editing, deleting, and commenting.

A report typically consists of a title and body (text information), and it is preferable that the images and other electronic document files can be attached to the report. The form of representation can be implemented similar to so-called blog posts. FIG. 14 is an embodiment of the screen (single sheet screen of an article). In the embodiment, the report is referred to as "Note".

Since reports are submitted (posted) by all users at any time, it is natural to record the data in the user file. FIG. 15 illustrates the implementation of the table in the embodiment, and a unique character string (article_code), title (title), body text (body) for the report, or other information are managed in the "notes" table. Comments are managed separately in the "notecomments" table. The "article_code" is a string format combining a user name and a serial number (auto-increment) and is always unique in a project.

3. Report Body and ID Analysis Function

The system preferably has a function to analyze the body text of the report and extract the ID. In one example, it is assumed that the following description is found in the body text: "The course of events on Oct. 21, 2018 can be summarized as follows. First, X moved to his house (Document ID 15400). Next, Y visited there (Document ID 12000, ID 937), and Z makes a statement contrary to this (Document ID 400). However it seems to contradict the point XX (Document ID 6256) . . . ."

The system analyzes such a statement using the regular expression and recognizes the part described after "document ID" as the number part of the document ID number. The system can arrange the display of the report screen by retrieving data from the virtual database on the basis of this information. For example, the description of document ID XXX can be automatically converted into a button or link that can display the document as an image. The description itself can also be converted into a shortened or other representation of the bibliographic data of the document. For example, the function for displaying a list of documents which the report refers to can be provided, too.

On the other hand, if the document ID to which each report refers is known, it is easy to also identify from which report the document ID is referred to, and thus, a function can be implemented to provide a list of reports or links to reports that refer to the particular document in the document list screen.

To refer a document from a report, it may be implemented to provide an input form (such as a selection form) dedicated to the note submission/editing screen or to associate a document by clicking on the document list display. However, the implementation of writing the ID directly in the text as described above is considered to be quicker in practice.

4. Search Function for Reports

It is preferably to provide a search function for reports. In one possible method, the user enters text information in a predetermined form, and the title and body are searched on the basis of the text information.

In the embodiment, the search (narrowing) results are displayed as a list of report titles and leads.

IX. Continuous Editing Function

As an extension of the meta-data editing function in the view screen, the embodiment implements the continuous editing function.

For example, a user may want to add notes to documents with the document code A1 to A30 sequentially viewing them. In other words, the user needs to view documents one after another in the view screen (FIG. 10) according to the order of the documents displayed in the table of the screen and to edit the meta-data. The continuous editing function is directed to achieve this.

The system of the embodiment according to the present invention can be implemented as follows.

For example, a certain button is pressed on the view screen, and thus the system is shifted to the continuous editing mode.

When the user displays an image of a document in the continuous editing mode, the system simultaneously puts the fields of the specified meta-data in the record into the editing state. For example, if the system is implemented to continuously edit only "memos", the display is the same as FIG. 10.

An example of an implementation in which only the "memo" is subject to continuous editing is described, and the processing procedure is as follows:
(1) The user opens the image of the document 100, and the "memo" of the document 100 becomes editable;
(2) The user edits the "memo" of the document 100 viewing the image of the document 100;
(3) The user finishes editing the "memo" of the document 100 and presses the Enter key in the form;
(4) The editing of the "memo" in the document 100 is determined;
(5) At the same time, the document image of the document 100 is closed;
(6) The system immediately opens the document image of document 101 and at the same time, puts the "memo" of document 101 into the editing state;
(7) The system moves the input focus to the "memo" field of the document 101; and
(8) The user edits the "memo" of the document 101 viewing the image of the document 101 (same as step (2), proceed to step (3)).

In the above way, the user can edit the "memo" field viewing documents one after another. In this operation procedure, the user only has to repeatedly enter text data into the "memo" and press the Enter key. This allows the user to repeat the editing of the "memo" in a fast and continuous manner.

The display method of the view screen is possibly contrived as follows.
(1) The size of the document image display should be almost equal to the full screen, because users are expected to work with only one document at a time.
(2) Since the user is assumed to move records one after another as described above, the viewer program preferably has an automatic scrolling function. Every time the user moves one record, the screen is scrolled by one record.

X. Batch Download Function

According to the embodiment of the present invention, the users are assumed to handle a large number of documents at once. For example, the users may print out tens of documents at once, or provide hundreds of electronic document data with external parties in bulk. In such cases, it is convenient for the user to be able to manipulate files directly on the folder.

In the embodiment, opening the "Document" folder in the project folder, the user can see all the electronic document files. However, allowing the user to open the folder directly not necessarily advantageous. In addition, it is preferred to reflect the latest bibliographic data held by the system on the file names.

In the embodiment, the system implements a batch download function of electronic document files, and the function is as follows.

Function

Batch download of electronic document files for those selected by the user among the records displayed in the view screen (or all). The user specifies an appropriate local folder, such as one on the desktop.

The file names downloaded are generated on the basis of the record information on the virtual database (i.e., the latest information).

The file names may be generated in some manners, for example, (1) Document code first, (2) Date first, (3) Document ID first; the user can arrange data according to the element described at the top by sorting data by file names in the folder. Even if each file includes a single bibliographic element, the user can freely choose the order of files while handling them in the folder, thereby bringing significant benefits to users.

Example: (The following three forms can be selected)
A020_H301120_Statement@PatentTaro ID2500.pdf
H301120_A020Statement@PatentTaro ID2500.pdf
ID2500_H301120_A020Statement@PatentTaro.pdf Implementation Method "Download" is reasonable to be a copy operation as the program implementation. While being described as "download" in terms of the user's point of view, the operation is "copy" in the implementation in the program and "copy" also can be applied to the NAS configuration.

File names are composed of the character strings of bibliographic data concatenated in an appropriate order on the basis of the record information in the virtual database. The concatenation order is specified by the user. When the file is copied, the renaming operation is used together.

For the interface, appropriate buttons may be placed in on the document view screen.

When the automatic encryption and viewing functions described below are adopted, it is preferable to implement the password addition and unlock functions as well.

XI. Automatic Encryption and Viewing Function

In the embodiment of the present invention, confidential documents are also assumed to be handled, and thus a function for document encryption is preferably provided. For example, when the file synchronization service is used, there is increasing demand for encryption to be used because the electronic document files are held in the cloud.

However, if users are forced to enter a password every time they want to view an encrypted file, it greatly impairs the high-speed and continuous viewing characteristics of the system.

The following framework introduced can achieve both encryption of documents and continuous viewing.

Framework (1) Define a unique and strong password ("project password") for each project.
(2) Save the project password in the local terminal (e.g., in the application folder).
(3) Automatically add the project password by the system to the electronic document file at the time of document registration (or by user's operation or the like).
(4) Automatically pass the project password to the electronic document file, when the user views a document using the viewer program.
(5) Provide a function to generate a batch of files in which each project password of the electronic document files has been unlocked (e.g., as an option of the batch download function).

In addition, it is preferable to be able to select for each project whether the encryption function is used.

Effect

In the above framework, passwords are saved only in the local terminal. In this case, even if unauthorized access to the cloud is occurred, the confidentiality of the electronic document files is maintained.

The users can handle encrypted documents without any awareness of the existence of the password while using the system. The password is automatically added when the document is registered, and the password is automatically passed when the document is viewed. When the user wants to use the electronic document file itself, the file with the password unlocked can be used.

In this way, both convenience and security can be achieved.

Implementation Method

The project password is preferably automatically generated by the system, and, for example, the strong password with a 16-digit is generated. It is convenient to use a single password for each project, but a plurality of passwords may be implemented.

The password is stored in an appropriate location on the local terminal, such as in the application folder. When a password is shared in a team, for example, the administrator user generates the password and passes it to other users in an appropriate manner, and then the users register the password in their own systems.

The addition and transfer of passwords can be achieved using appropriate libraries. For example, libraries such as "poppler" and "PDF.js" are known for PDF files in the main data format, and "poppler" may be used to add passwords and "PDF.js" may be used to transfer passwords for viewing.

Of course, this kind of processing may not be implemented depending on the data format. However, the above can be implemented in PDF files, which are the main data format, and thus, there is practically no problem, for example, when the user follows the rule that confidential documents must be in PDF format.

In addition, the above batch download function preferably includes a batch password assignment function and an unlock function as well. Appropriate libraries (e.g., poppler) can be used along with the batch download function.

Although the present invention has been described according to the embodiments, it will be appreciated that matters not concerned with the hardware configuration, such as the display form of the document list screen, the editing form of bibliographic data, the document registration function, and the report function, do not depend on the hardware configuration of the present invention. For example, the function of displaying bibliographic data on the document list screen while performing all the search, edit, and view functions consecutively without screen transition provides a high degree of convenience to users. However, such display, search, and editing functions can be directly applied to cloud-based document management systems, server-based data systems, and completely localized personal database systems. In addition, the method of removing a waiting time of users by finalizing the record editing results in memory and updating the HTML on a web browser in advance can also be applied to cloud-type systems that use web browsers. The document registration function, report function, and batch download function can also be applied in any form, regardless of whether it is cloud, server, or local type. In this respect, the various innovations according to each embodiment have universality that is not limited to the hardware configuration.

As the users (members) use the system more and more, the system accumulates a larger number of members' findings (notes and reports) on the project. A plurality of multifaceted findings by multiple members are stored in the system, and the members can freely search them. Furthermore, the increased bibliographic information and notes of the documents will gradually decrease documents lacking individuality.

In this way, the more the members use the system, the richer the information of the project becomes, developing members' thinking to create more findings. In this virtuous cycle, the system can greatly improve the intellectual production of the team, and of course, even individual users can benefit from this system.

This system has excellent features in terms of document organization functions, interfaces, and data sharing methods, but its ultimate aim is to provide an integrated environment for individuals and teams to develop great wisdom, as described above.

The present invention was conceived by the inventor, an attorney himself, creating a prototype in actual practice and making improvements to it. Because of such origin, the present invention has been described taking attorney services as the main example herein.

However, this system is highly effective if the task needs some of following:

(1) to manage not less than a certain amount of electronic documents in a folder (have files);
(2) to manage documents effectively by attaching appropriate bibliographic information to them;
(3) to perform comprehensive search, viewing, and editing of a document group in a quick and continuous (or comfortable) manner;
(4) to store and share data within the existing folder-based user environment without using a special server or cloud;
(5) to hold data in local terminals for speeding up, etc.; and
(6) to use document codes.

For example, the system can be assumed to be used by teams or individuals of researchers, the material management for publishing and editing businesses, investigation committees or third party committees, civic groups utilizing information disclosure, the document arrangement for individuals, and document management for small organizations.

The present invention can be easily applied to a wide range of businesses with some customization to suit the business operations. The present invention has universality that is not limited to any industry and is considered to have wide applicability.

The invention claimed is:

1. A memory having stored thereon a program of instructions executable by a processor that configures a computing system for organizing document data, comprising:
   a database program for managing a set of database files provided for users at user terminals;
   a display program for generating data to visualize a part or all of a table, the set of database files being described in the table; and
   a viewer program for displaying the data generated by the display program on a screen of each user terminal;
   wherein each database file is a readable and writable file in a folder of the computing system, and is a master file or a user file;
   wherein the set of database files comprises user files including, for each user, a user file assigned to that user, wherein only that user at the user terminal has permissions for editing that user's user file, and that user does not have permissions for editing other users' user files;
   wherein the set of database files further comprises a master file where initial information is recorded;

wherein the database program has a function that loads information from a part or all of the set of database files into a memory of the user terminal and builds a virtual database in the memory based on the loaded information;

wherein, for each of a plurality of electronic documents, the virtual database holds a storage destination path of the electronic document, the storage destination path being associated with a unique document ID assigned by the database program, and wherein the electronic document can be read through the storage destination path, the storage destination path being dynamically generated by the database program or being an absolute path;

wherein the virtual database also holds meta-data assigned to each electronic document;

wherein, after a first user edits the meta-data of a first electronic document:

(1) the edited meta-data is written into the virtual database of the first user's user terminal, and then written into the first user's user file; or (2) the edited meta-data is written into the first user's user file, and then a part or all of the set of database files is reloaded into the memory of the first user's user terminal to rebuild the virtual database of the first user's user terminal; and wherein the virtual database of each user's user terminal has a function that upon a predetermined event or timing reloads information from a part or all of the set of database files and rebuilds the virtual database in the memory based on the reloaded information; and wherein the set of database files is shared with other terminals through a network even while the database program is running.

2. The memory having a program that configures a computing system for organizing document data according to claim 1, wherein the viewer program loads a program written in a scripting language to change the screen display generated based on the data generated by the display program and executes a function to allow the user to start viewing or editing of the meta-data.

3. The memory having a program that configures a computing system for organizing document data according to claim 2, wherein the display program is a web server program and the viewer program is a web browser.

4. The memory having a program that configures a computing system for organizing document data according to claim 1, wherein the meta-data includes at least one of pieces of information regarding creation date, title, type, and author of the electronic document.

5. The memory having a program that configures a computing system for organizing document data according to claim 1, wherein the virtual database is a key-value type database table consisting of keys and values.

6. The memory having a program that configures a computing system for organizing document data according to claim 5, wherein the key is a unique document ID assigned to the electronic document.

7. The memory having a program that configures a computing system for organizing document data according to claim 1, wherein the set of database files is synchronized with other terminals at any time even while the database program is running.

8. The memory having a program that configures a computing system for organizing document data according to claim 7, wherein the synchronization of the set of database files is performed via either peer-to-peer, a shared folder in a local area network, or a server in the cloud.

9. The memory having a program that configures a computing system for organizing document data according to claim 1, wherein the display program makes the viewer program execute a program code to display contents of the electronic document by mouse hover or click.

10. The memory having a program that configures a computing system for organizing document data according to claim 1, further comprising a function for creating text data associated with any of a plurality of electronic documents or not associated with any of the plurality of electronic documents.

11. The memory having a program that configures a computing system for organizing document data according to claim 1, wherein the display program and the viewer program are the same program.

12. The memory having a program that configures a computing system for organizing document data according to claim 1, wherein the set of database files is associated with a single project, and a plurality of sets of database files are provided in a single user terminal, and wherein each project is assigned an independent document ID.

13. The memory having a program that configures a computing system for organizing document data according to claim 1, wherein the viewer program searches or displays only electronic documents in a single project.

14. The memory having a program that configures a computing system for organizing document data according to claim 1, wherein the viewer program has a function for switching operation to search or display electronic documents in different projects by loading of different sets of database files.

15. The memory having a program that configures a computing system for organizing document data according to claim 1, wherein the function that loads information from a part or all of the set of database files into a memory of the user terminal and builds a virtual database in the memory based on the loaded information reads information from each user's user file and integrates and structures the information read from each user's user file into the virtual database.

16. A method for a computing system having a processor and a memory to organize document data, the method comprising providing, by the computing system:

managing, by a database program, a set of database files provided for users at user terminals;

generating, by a display program, data to visualize a part or all of a table, the set of database files being described in the table; and displaying, by a viewer program, the data generated by the display program on a screen of each user terminal;

wherein each database file is a readable and writable file in a folder of the computing system, and is a master file or a user file;

wherein the set of database files comprises user files including, for each user, a user file assigned to that user, wherein only that user at the user terminal has permissions for editing that user's user file, and that user does not have permissions for editing other users' user files;

wherein the set of database files further comprises a master file where initial information is recorded;

wherein the database program has a function that loads information from a part or all of the set of database files into a memory of the user terminal and builds a virtual database in the memory based on the loaded information;

wherein, for each of a plurality of electronic documents, the virtual database holds a storage destination path of the electronic document, the storage destination path being associated with a unique document ID assigned by the database program, and wherein the electronic document can be read through the storage destination path, the storage destination path being dynamically generated by the database program or being an absolute path;

wherein the virtual database also holds meta-data assigned to each electronic document;

wherein, after a first user edits the meta-data of a first electronic document:

(1) the edited meta-data is written into the virtual database of the first user's user terminal, and then written into the first user's user file; or (2) the edited meta-data is written into the first user's user file, and then a part or all of the set of database files is reloaded into the memory of the first user's user terminal to rebuild the virtual database of the first user's user terminal; and wherein the virtual database of each user's user terminal has a function that upon a predetermined event or timing reloads information from a part or all of the set of database files and rebuilds the virtual database in the memory based on the reloaded information; and wherein the set of database files is shared with other terminals through a network even while the database program is running.

\* \* \* \* \*